US011265550B2

(12) United States Patent
Taubman

(10) Patent No.: US 11,265,550 B2
(45) Date of Patent: Mar. 1, 2022

(54) FURTHER IMPROVED METHOD AND APPARATUS FOR IMAGE COMPRESSION

(71) Applicant: KAKADU R & D PTY LTD, Redfern (AU)

(72) Inventor: David Scott Taubman, Redfern (AU)

(73) Assignee: KAKADU R & D PTY LTD, Redfern (AU)

( * ) Notice: Subject to any disclaimer, the term of this patent is extended or adjusted under 35 U.S.C. 154(b) by 0 days.

(21) Appl. No.: 17/044,637

(22) PCT Filed: Apr. 4, 2019

(86) PCT No.: PCT/AU2019/050299
§ 371 (c)(1),
(2) Date: Oct. 1, 2020

(87) PCT Pub. No.: WO2019/191811
PCT Pub. Date: Oct. 10, 2019

(65) Prior Publication Data
US 2021/0112250 A1    Apr. 15, 2021

(30) Foreign Application Priority Data

Apr. 4, 2018 (AU) ................................ 2018901112
Apr. 13, 2018 (AU) ................................ 2018901249
May 3, 2018 (AU) ................................ 2018901512

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/119* (2014.11);
(Continued)

(58) Field of Classification Search
None
See application file for complete search history.

(56) References Cited

U.S. PATENT DOCUMENTS 6,678,419 B1 * 1/2004 Malvar .................. H03M 7/40
375/240.08
2005/0084168 A1 * 4/2005 Fukuhara ............... H04N 19/70
382/240

(Continued)

FOREIGN PATENT DOCUMENTS

WO    WO 2019/191811    10/2019

OTHER PUBLICATIONS

Taubman, "High Performance Scalable Image Compression with EBCOT," IEEE Transactions on Image Processing, vol. 9, No. 7, Jul. 2000.*
International Search Report and Written Opinion dated Jun. 17, 2019 by the International Searching Authority for International Application No. PCT/AU2019/050299, filed on Apr. 4, 2019 and published as WO 2019/191811 on Oct. 10, 2019 (Applicant— KAKADU R & D PTY LTD) (8 Pages).
(Continued)

*Primary Examiner* — Michael J Hess
(74) *Attorney, Agent, or Firm* — Ballard Spahr LLP

(57) ABSTRACT

The present invention relates to an improved method and apparatus for image compression and particularly to an improved block coding apparatus and method for compression for use with the JPEG2000 standard, although not limited to this. Methods for coding and decoding blocks and subbands samples derived from still images video frames or related media, involving three bit-streams and the partitioning of samples from the blocking to define groups, is provided. A first bit-stream encodes the significance of whole groups. A second bit-stream encodes the significance of individual samples within each group. The second bit-stream also encodes an unsigned residual value for each significant group. A third bit stream provides a sign bit and any additional magnitude bits required to represent the significant sample values. Exponent predictors are computal (Continued)

using both exponent bounds and the additional magnitude bits associated with previous samples in the block.

20 Claims, 9 Drawing Sheets

(51) Int. Cl.
<table>
<tr><td>H04N 19/119</td><td>(2014.01)</td></tr>
<tr><td>H04N 19/176</td><td>(2014.01)</td></tr>
<tr><td>H04N 19/184</td><td>(2014.01)</td></tr>
<tr><td>H04N 19/93</td><td>(2014.01)</td></tr>
<tr><td>H04N 19/91</td><td>(2014.01)</td></tr>
<tr><td>H04N 19/64</td><td>(2014.01)</td></tr>
<tr><td>H04N 19/63</td><td>(2014.01)</td></tr>
<tr><td>H04N 19/70</td><td>(2014.01)</td></tr>
<tr><td>H04N 19/61</td><td>(2014.01)</td></tr>
</table>

(52) U.S. Cl.
CPC ......... *H04N 19/176* (2014.11); *H04N 19/184* (2014.11); *H04N 19/61* (2014.11); *H04N 19/63* (2014.11); *H04N 19/647* (2014.11); *H04N 19/70* (2014.11); *H04N 19/91* (2014.11); *H04N 19/93* (2014.11)

(56) References Cited

U.S. PATENT DOCUMENTS

| | | | |
|---|---|---|---|
| 2014/0064365 A1* | 3/2014 | Wang | H04N 19/13 375/240.12 |
| 2015/0264362 A1* | 9/2015 | Joshi | H04N 19/115 375/240.18 |
| 2017/0118473 A1* | 4/2017 | Thirumalai | H04N 19/436 |
| 2018/0176582 A1* | 6/2018 | Zhao | H04N 19/619 |

OTHER PUBLICATIONS

Taubman, D. et al., "High Throughput JPEG 2000: New Algorithms and Opportunities," UNSW Sydney, Australia, Oct. 26, 2017 (8 pages).

Taubman, D., et al, "FBCOT: a fast block coding option for JPEG 2000", Proceedings of SPIE, U.S., vol. 10396, Sep. 19, 2017, pp. 103960T-103960T.

Taubman, D., et al, "FBCOT: A fast block coding option for JPEG2000", 72. JPEG Meeting; May 29, 2016-Jun. 3, 2016; Geneva; (Joint Picture Expert Group Or ISO/IEC JTC1/SC29/WG1); URL: https://www.iso.org, No. wg1m72011, May 23, 2016.

Taubman, D., "FBCOT: A fast block coding option for JPEG 2000", 73. JPEG Meeting: Oct. 14, 2016-Oct. 21, 2016; Chengdu; (Joint Picture Expert Group Or ISO/IEC JTC1/SC29/WG1); URL: https://www.iso.org, No. wg1m73067, Oct. 16, 2016.

* cited by examiner

FURTHER IMPROVED METHOD AND APPARATUS FOR IMAGE COMPRESSION

This application is a U.S. National Phase Application of International Application No. PCT/AU2019/050299, filed Apr. 4, 2019, which claims priority to AU 2018901112, filed Apr. 4, 2018, AU 2018901249 filed Apr. 13, 2018, and AU 2018901512, filed May 3, 2018, all of which applications are hereby incorporated by reference in their entireties.

FIELD OF THE INVENTION

The present invention relates to an improved method and apparatus for image compression and particularly, but not exclusively, to an improved block coding apparatus and method for image compression.

BACKGROUND OF THE INVENTION

Image compression systems are known. JPEG and JPEG2000 are popular standards for image compression.

JPEG 2000 provides a rich set of features that find application in many diverse fields. Some of the most important features are as follows:
Compression efficiency
Quality scalability
Resolution scalability
Region-of-interest accessibility
Parallel computation
Optimized rate control without iterative encoding
The ability to target visually relevant optimization objectives
Error resilience
Compressed domain (i.e. very low memory) transposition and flipping operations
Ability to re-sequence information at the code-block, precinct or J2K packet level Most of these features derive from the use of the EBCOT algorithm (Embedded Block Coding with Optimized Truncation), while use of the hierarchical Discrete Wavelet Transform (DWT) also plays an important role.

In addition to these core features, the JPEG 2000 suite of standards provide good support for the following applications:
Efficient and responsive remote interactive browsing of imagery (including video and animations) via JPIP.
Efficient on demand rendering of arbitrary regions from huge imagery sources.
High dynamic range compression, through the use of non-linear tone curves and/or custom floating point mappings.
Rich metadata annotation.
Efficient compression of hyper-spectral and volumetric content.

The one significant drawback of the JPEG 2000 standards is computational complexity. It is not immediately clear how significant a limitation this is for hardware implementations, since JPEG 2000 provides many modes that can be used to target efficient hardware solutions. Also, software implementations are sufficiently efficient that images of just about any displayable size can be rendered nearly instantaneously on modern platforms, including mobile devices. However, for video applications and for applications that are especially power conscious, compression and rendering complexity can become a problem.

Earlier International Patent Application no. PCT/AU2017/050484, discloses an improved method and apparatus for image compression, which incorporates a Fast Block Coding Algorithm. The disclosure of this earlier application is incorporated herein by reference.

SUMMARY OF THE INVENTION

In accordance with a first aspect, the present invention provides a method for coding blocks of subband sample values, derived from still images, video frames or related media, involving three bit-streams and the partitioning of samples from the block into defined groups, wherein:
a. a first bit-stream (MEL bit-stream) encodes the significance of whole groups (AZC groups) whose causal neighbours are all insignificant, where samples with non-zero magnitude are identified as significant, and those with zero magnitude as insignificant;
b. a second bit-stream (VLC bit-stream) encodes the significance of individual samples within each group that is either a significant AZC group or not an AZC group;
c. said second bit-stream (VLC bit-stream) also encodes an unsigned residual value for each significant group, that when added to a set of exponent predictors, provides an upper bound on the magnitude exponent of each significant sample in the group;
d. a third bit-stream (MagSgn bit-stream) provides a sign bit and any additional magnitude bits required to represent the significant sample values, given the corresponding exponent bounds;
e. said exponent predictors are computed using both exponent bounds and the additional magnitude bits associated with previous samples in the block, except where such previous samples would lie outside the boundaries of the block.

In accordance with a second aspect, the present invention provides a method for decoding blocks of subband samples, producing still image, video frames or related media, such samples being arranged into defined groups and represented using three bit-streams, wherein:
a. a first bit-stream (MEL bit-stream) is decoded to discover the significance of whole groups (AZC groups) whose causal neighbours are all insignificant, where samples with non-zero magnitude are identified as significant, and those with zero magnitude as insignificant;
b. a second bit-stream (VLC bit-stream) is decoded to discover the significance of individual samples within each group that is either a significant AZC group or not an AZC group;
c. decoding of said second bit-stream (VLC bit-stream) is also used to discover an unsigned residual value for each significant group, that when added to a set of exponent predictors, provides an upper bound on the magnitude exponent of each significant sample in the group;
d. a third bit-stream (MagSgn bit-stream) is unpacked to discover a sign bit and any additional magnitude bits that are used to deduce the value of each significant sample, given the corresponding exponent bounds; and
e. said exponent predictors are computed using both exponent bounds and the additional magnitude bits associated with previously decoded samples in the block, except where such previous samples would lie outside the boundaries of the block.

In accordance with a third aspect, the present invention provides an apparatus for coding blocks of subband sample values, comprising a processing apparatus which is arranged to implement the method of the first aspect of the invention.

In embodiments, the apparatus may comprise a processor, memory and operating system implementing software processes for implementing the method of the first aspect of the invention. In other embodiments, the apparatus may comprise hardware implementing the method or a mixture of hardware and software implementing the method.

In accordance with a fourth aspect, the present invention provides an apparatus for decoding blocks of subband samples, comprising a processing apparatus arranged to implement a method in accordance with the second aspect of the invention.

In embodiments, the apparatus may comprise a processor, memory and operating system implementing software processes for implementing the method of the second aspect of the invention. In other embodiments, the apparatus may comprise hardware implementing the method or a mixture of hardware and software implementing the method.

In accordance with a fifth aspect, the present invention provides a computer program, comprising instructions for controlling a computer to implement a method in accordance with the first aspect of the invention.

In accordance with a sixth aspect, the present invention provides a non-volatile computer readable medium, providing a computer program in accordance with the fifth aspect of the invention.

In accordance with a seventh aspect, the present invention provides a data signal, comprising a computer program in accordance with the fifth aspect of the invention.

In accordance with an eighth aspect, the present invention provides a computer program, comprising instructions for controlling a computer to implement the method of the second aspect of the invention.

In accordance with a ninth aspect, the present invention provides a non-volatile computer readable media, providing a computer program in accordance with the eighth aspect of the invention.

In accordance with a tenth aspect, the present invention provides a data signal, comprising a computer program in accordance with the eighth aspect of the invention.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF EMBODIMENTS

Figure 1:
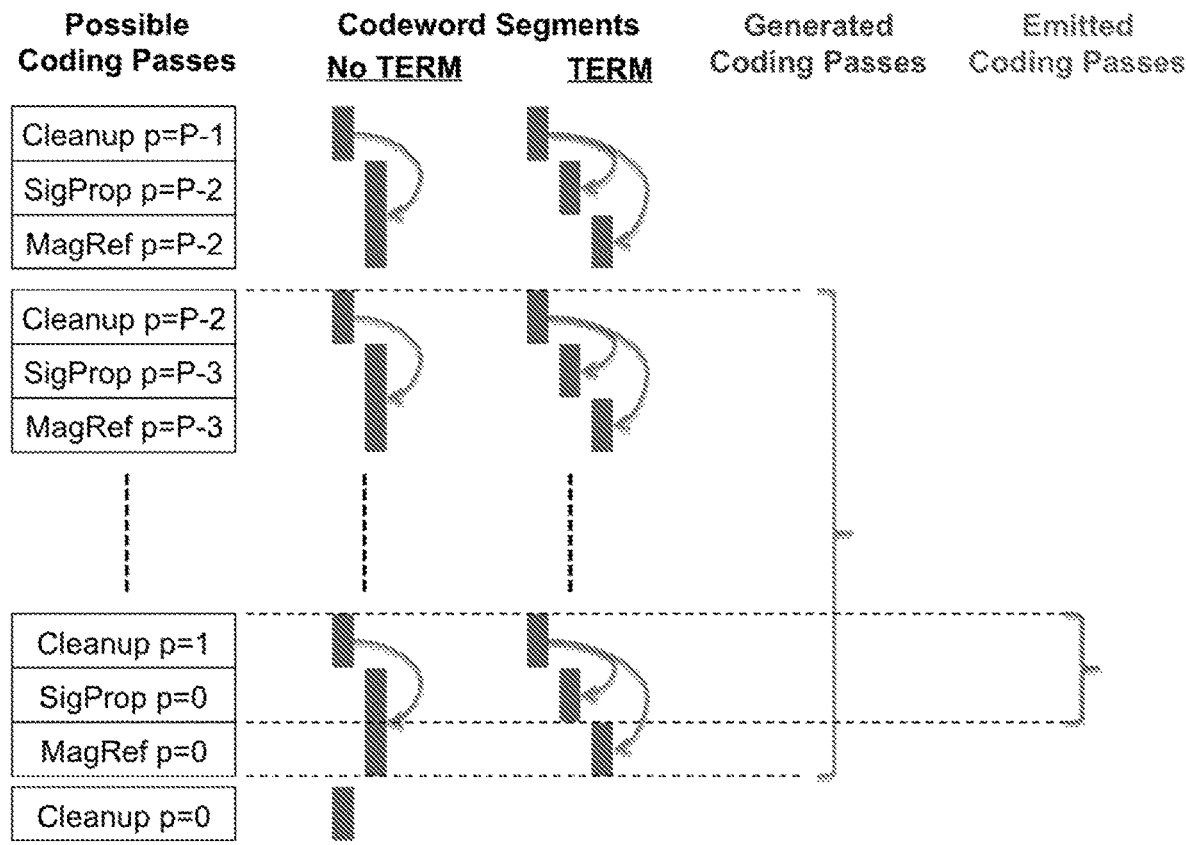
FIG. 1 is a diagram showing FAST coding passes showing the codeword segments that are produced with/without the TERMINATION mode flag, as well as examples of coding passes that might be generated by an encoder and ultimately emitted to the code stream, in accordance with an embodiment.

An embodiment of the present invention relates to a drop-in replacement for the original JPEG 2000 block coding algorithm that is described in Annexes C and D of IS 15444-1 (JPEG 2000 Part-1). Throughout this document, the terms "J2K-1 block coder" and "J2K-1 algorithm" shall be used to identify this block coding algorithm, which is also central to other JPEG 2000 standards, including IS 15444-2 (JPEG 2000 Part-2), 1515444-3 (Motion JPEG 2000), IS 15444-6 (Compound Document Compression) and IS 15444-9 (JPIP). As a drop-in replacement for the JPK-1 algorithm, the block coding algorithm described in this embodiment is able to be used in conjunction with these other standards to dramatically increase throughput, while retaining most existing features.

Importantly, the block coding algorithm described in this document allows completely lossless transcoding to/from codestreams that have been generated using the J2K-1 algorithm.

The price paid for the dramatic reduction in complexity associated with the block coding algorithm described here is a modest reduction in compression efficiency, plus elimination (or near elimination) of the quality scalability feature of JPEG 2000.

Quality scalability is important, especially for interactive browsing applications via JPIP, where quality scalability essentially translates into large savings in communication and/or increase in responsiveness of the browsing application.

Quality scalability can also be important in distribution systems; it provides an elegant solution for progressive degradation of image/video archives if required; and it also enables selective protection and/or encryption of content, all of which are important for many applications. Fortunately, though, the transcoding feature of the proposed algorithm in this embodiment means that quality scalability can be retrieved or temporarily surrendered at will, by selectively transcoding the block bit streams associated with images, video frames, volumes, or even individual regions within an image or volume, in order to manage performance and power consumption objectives within media systems.

We use the term FBCOT (FAST Block Coder with Optimized Truncation) for the proposed approach, because the "embedded" property of the original EBCOT algorithm is largely (but not entirely) lost, but the ability to perform post compression rate-distortion optimization remains. Throughout this document, we simply use the term FAST to refer to the block coding algorithm itself, while FBCOT refers to the combination of this algorithm with a rate control algorithm.

The rate control aspects of the FBCOT algorithm are largely described elsewhere, allowing this document to focus on a detailed description of the FAST block coder itself.

The algorithm described in this embodiment represents an evolution from the FBCOT algorithm that was originally proposed in response to the JPEG-XS CfP, where its objective performance was significantly higher than other approaches, especially at low bit-rates. During the JPEG-XS evaluation process, it was decided that JPEG 2000 extensions for high throughput would be best managed through a separate activity, known as High Throughput JPEG 2000 (HTJ2K), which is expected to become Part-15 of the JPEG 2000 family of standards. The motivation behind the FBCOT algorithm and, in particular, its FAST block coder align precisely with those of the HTJ2K activity.

In particular, the objectives of this embodiment are:
1. The HTJ2K block coding algorithm should support reversible transcoding to/from J2K-1 block bit-streams.
2. The impact of the technology introduced to JPEG 2000 via HTJ2K should be limited to the encoding and decoding of code-block bit-streams only, having no impact on codestream syntax, including packet header syntax, other than the inevitable changes required to codestream/tile-part header markers to signal the presence of the new coding style.
3. The HTJ2K block decoder should on average be at least 10× faster than the J2K-1 block decoder implementation within the popular commercial Kakadu™ toolkit[1] over a range of conditions that are important in practical applications, including transcoded content as well as content encoded directly using HTJ2K.
4. The HTJ2K block encoder should on average be at least 10× faster than the J2K-1 block encoder implementation within Kakadu™, over a range of conditions that are important in practical applications.

[1] http://www.kakadusoftware.com—comparisons relate to the regular Kakadu distribution, as opposed to the Kakadu Speed-Pack edition, which can be 50% faster.

5. The coding efficiency of the HTJ2K block coding algorithm should on average be no more than 15% worse than that of the J2K-1 block coding algorithm, over a range of conditions that are important in practical applications.

We describe here three application areas which can benefit from the FBCOT algorithm described in this document, all of which can be realized within the framework anticipated for the HTJ2K standard.

High Resolution Video Capture

Most mobile devices do not have sufficient CPU power to directly compress the high resolution video streams that their image sensors are capable of producing, if the J2K-1 block coding algorithm is used. A FAST block coding option addresses this problem by allowing compressed streams to be produced in real time and then later transcoded to the J2K-1 representation if quality scalability attributes are important—e.g. for efficient interactive browsing via JPIP. While transcoding is possible between any two compression formats, the advantages of the FBCOT algorithm described in this document are:
  a) Transcoding can take place in the transformed domain;
  b) Transcoding is inherently lossless, even if though the compression itself is lossy; and
  c) Transcoding can be done selectively, as the need arises, even on a code-block by code-block basis.

Energy Efficient Image/Video Rendering

In many applications of JPEG 2000, content is rendered multiple times. For example, large images are viewed interactively, by resolution or region of interest, so that successive rendered views contain many code-blocks in common. It is rarely practical to cache fully decompressed code-blocks in memory, but the availability of a FAST block coding option means that intelligent content caches can choose to transcode code-blocks that are being repeatedly accessed to a representation that can be decoded more quickly, or with less energy consumption. The advantage of the algorithm described in this document is that transcoding of J2K-1 block bit-streams to FAST block bit-streams is both computationally efficient and entirely lossless; all aspects of the original JPEG 2000 representation are preserved exactly.

Cloud Based Video Services

JPEG 2000 provides an excellent framework as an intermediate distribution format for video content, allowing the resolution (or even region) of interest to be extracted efficiently, close to the point of delivery, whereupon it may be transcoded into any of a number of common streaming video formats. While this use is already viable and potentially favourable over other approaches, such applications can further benefit from the availability of a light weight block coder, which preserves all other relevant functionality.

Brief Review of the J2K-1 Block Coding Algorithm

The J2K-1 block coder, as described in IS15444-1, processes the subband samples within each code-block through a sequence of coding passes. It is helpful to briefly revise this in order to explain the different, yet related coding pass structure of the FAST block coding algorithm in the next section.

Let X[n] denote the samples within a code-block, indexed by location $n=(n_1, n_2)$, where $0 \le n_1 < W$ represents horizontal position, $0 \le n_2 < H$ denotes vertical position, and W and H are the code-block's width and height, respectively. Each coding pass belongs to a bit-plane index $p \ge 0$, with respect to which the quantized magnitude of sample X[n] is given by $$M_p[n] = \left\lfloor \frac{|X[n]|}{2^p \Delta} \right\rfloor$$

Here, $\Delta$ is the quantization step size, that is not present for reversible coding procedures.

We say that sample X[n] is "significant" with respect to bit-plane p if $M_p[n] \ne 0$.

The finest bit-plane (highest quality) corresponds to p=0, while the coarsest quality corresponds to p=K−1, where K is the maximum number of bit-planes for any code-block belonging to a given subband, determined by subband-specific parameters recorded in codestream headers.

For each code-block a parameter $M_{start}$ is communicated via the relevant JPEG 2000 packet headers, which is interpreted as the number of missing bit-planes in the code-block's representation. The J2K-1 block decoder is entitled to expect that all samples in the code-block are insignificant in bit planes $p \ge K - M_{start}$. Equivalently, the total number of bit-planes that may contain significant samples is given by $$P = K - M_{start}$$

The first J2K-1 coding pass encodes the significance information and sign (for significant samples only) for bit-plane p=P−1. This coding pass is identified as a "Cleanup" pass. Importantly, any significant sample coded in this cleanup pass must have magnitude 1.

For each successively finer bit-plane, three coding passes are produced, identified as the "SigProp" (Significance Propagation) and "MagRef" (Magnitude Refinement) coding passes. In total then, there are 3P−2 coding passes, with the following structure.

Cleanup (p=P-1): Codes significance, in bit-plane p, of all samples, plus the sign of significant samples.

SigProp (p=P-2): Visits insignificant neighbours of known significant samples, coding their significance (and sign), in plane p.

MagRef (p=P-2): Visits samples that were already significant with respect to plane p+1, coding the least significant bit of $M_p[n]$.

Cleanup (p=P-2): Codes significance (and sign), in bit-plane p, of all samples whose significance has not yet been established.

SigProp (p=P-3): . . .

MagRef (p=P-3): . . .

Cleanup (p=P-3): . . .

. . .

Cleanup (p=0): . . . .

Note that the encoder may drop any number of trailing coding passes from the information included in the final codestream. In fact, the encoder need not generate such coding passes in the first place if it can reasonably anticipate that they will be dropped.

All coding passes of the J2K-1 block coder adopt a stripe oriented scanning pattern, with 4 line stripes. The columns of each stripe are visited from left to right before moving to the next stripe, while inside each stripe column the 4 samples of the stripe column are scanned from top to bottom.

The block coder employs arithmetic coding for all symbols in the cleanup pass, but can optionally emit raw (uncoded) bits for certain SigProp and MagRef coding passes. This mode, in which raw bits are emitted for non-cleanup passes, is identified as the "arithmetic coder bypass" mode, or just the "BYPASS" mode for short, as identified by bit-0 (LSB) of the code-block style field within the relevant COD/COC marker segment.

Overview of the FAST Block Coding Algorithm

Coding Pass Structure

The FAST block coder also adopts a coding pass structure, with Cleanup, SigProp and MagRef coding passes, defined with respect to bit-planes p. Significantly, however, the Cleanup pass associated with each bit-plane p fully encodes the magnitudes $M_p[n]$ and the signs of those samples for which $M_p[n] \neq 0$. This information completely subsumes that associated with all previous (larger p) coding passes, so that there is no point in emitting them to the codestream.

It follows that both leading and trailing coding passes may be dropped (or never generated) by the encoder, so long as the first emitted coding pass is a Cleanup pass. In fact, an encoder never needs to include more than 3 coding passes for any given code-block in the final codestream. FIG. 1 illustrates the coding passes that might be generated by the FAST block encoder and/or emitted to the final codestream.

From a decoder's perspective the $M_{start}$ value that is recovered by parsing the JPEG 2000 packet headers still serves to identify the bit-plane index $p=K-M_{start}-1$ associated with the first available coding pass for the code-block. However, since the FAST Cleanup pass can encode multiple magnitude bits for any given sample, $M_{start}$ can no longer be interpreted as the number of leading magnitude bits that are all 0. Encoders should be careful to ensure that $M_{start}$ correctly describes the first emitted coding pass with non-zero length for each code-block.

NB: As we shall see, a FAST cleanup pass necessarily involves at least 2 bytes. It can be convenient to allow codestream writers to generate packet headers that identify initial coding passes with zero length, since these can be associated with coding passes from a J2K-1 coded code-block that has been transcoded to use the FAST block coder. This allows the transcoded representation to be transcoded back to the original J2K-1 representation without losing the original relationships between quality layers and code-block truncation points.

The SigProp and MagRef coding passes generated by the FAST block coder do not depend on each other; they depend only on the immediately preceding Cleanup pass. The SigProp and MagRef coding passes generated by the FAST block coder encode exactly the same information as the corresponding coding passes of the J2K-1 block coder, so that the effective quantization associated with truncating the representation at the end of a Cleanup, SigProp or MagRef pass is the same, regardless of whether the FAST block coding algorithm or the J2K-1 algorithm is used.

All significance and associated sign information from the SigProp pass is emitted as raw binary digits and all magnitude refinement information from the MagRef pass is emitted as raw binary digits, where these raw bit-streams are subjected only to the bit-stuffing procedure used by the J2K-1 algorithm, to avoid the appearance of false marker codes in the range FF90h to FFFFh[2].

[2] Actually, bit-stuffing in JPEG 2000 raw codeword segments avoids the appearance of byte pairs whose big-endian hex value lies in the range FF80h to FFFFh, but the block coding algorithm in general is only required to avoid marker codes in the range FF90h to FFFFh.

The MagRef pass adopted by the FAST block coding algorithm is identical to that of the J2K-1 algorithm, operating in the BYPASS mode, except that code bits are packed into bytes with a little-endian bit order. That is, the first code bit in a byte appears in its LSB, as opposed to its MSB.

The SigProp coding pass adopted by the FAST block coding algorithm is also very similar to that of the J2K-1 block coder, operating in the BYPASS mode, with the following two differences:

1. Code bits are again packed into bytes of the raw bit-stream with a little-endian bit order, whereas the J2K-1 block coder uses a big-endian bit packing order.
2. The significance bits associated with one or more stripe columns are emitted first, followed by the associated sign bits, before advancing to the next set of stripe columns, whereas the J2K-1 block coder inserts any required sign bit immediately after the same sample's magnitude bit.

These modifications together have implementation advantages over the methods of the J2K-1 algorithm, especially for software based implementations. We note that the second modification listed above is carefully crafted to allow accelerated decoding based on modest lookup tables.

Apart from the block coding algorithm itself, the FAST block coder has no impact on other JPEG 2000 codestream constructs or their interpretation. Precincts, packets, tiles, transforms, and all other JPEG 2000 elements remain unchanged. In particular, the construction of JPEG 2000 packets depends upon the codeword segments that are produced by the block coder.

A codeword segment is a sequence of bytes, whose length is necessarily identified via the packet header. The J2K-1 block coder may pack all coding passes into a single codeword segment (default mode); in the TERMINATION mode, however, each coding pass is assigned its own codeword segment, while in the BYPASS mode(s) without TERMINATION, consecutive SigProp and MagRef coding passes are assigned to a single codeword segment.

The FAST cleanup pass is always assigned its own codeword segment, so the BYPASS mode has no impact. However the TERMINATION mode is respected.

The CAUSAL mode flag is also supported by the FAST block coder to ensure completely reversible transcoding to/from J2K-1 block bit streams, since it affects the information that is represented by the SigProp coding pass.

SEGMARK, ERTERM, RESET and BYPASS mode flags are ignored when found in conjunction with the FAST block coder, but the flags can all be preserved to support truly reversible transcoding from codestreams based on the J2K-1 block coder to those based on the FAST block coder, and back again.

Cleanup Pass Overview

Figure 2:
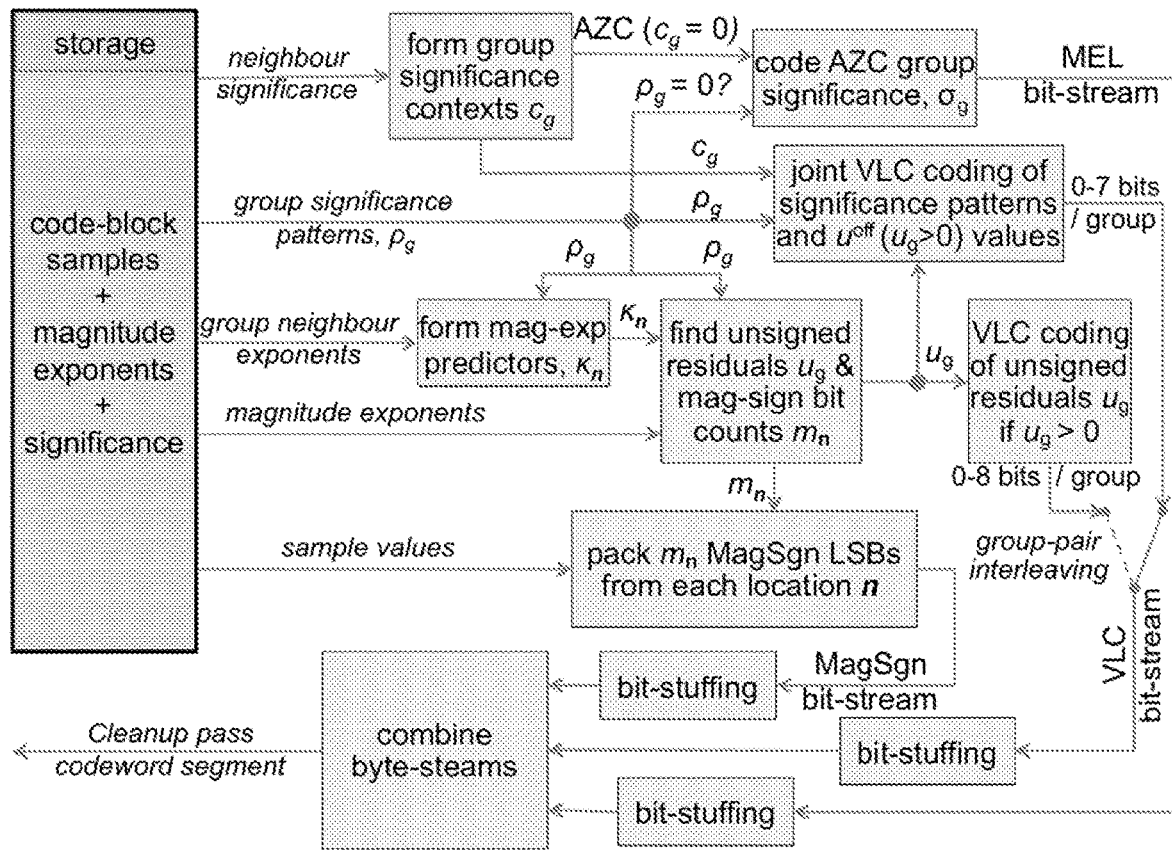
FIG. 2 is a diagram showing an overview of a FAST Cleanup pass and coding process, according to an embodiment.
Figure 3:
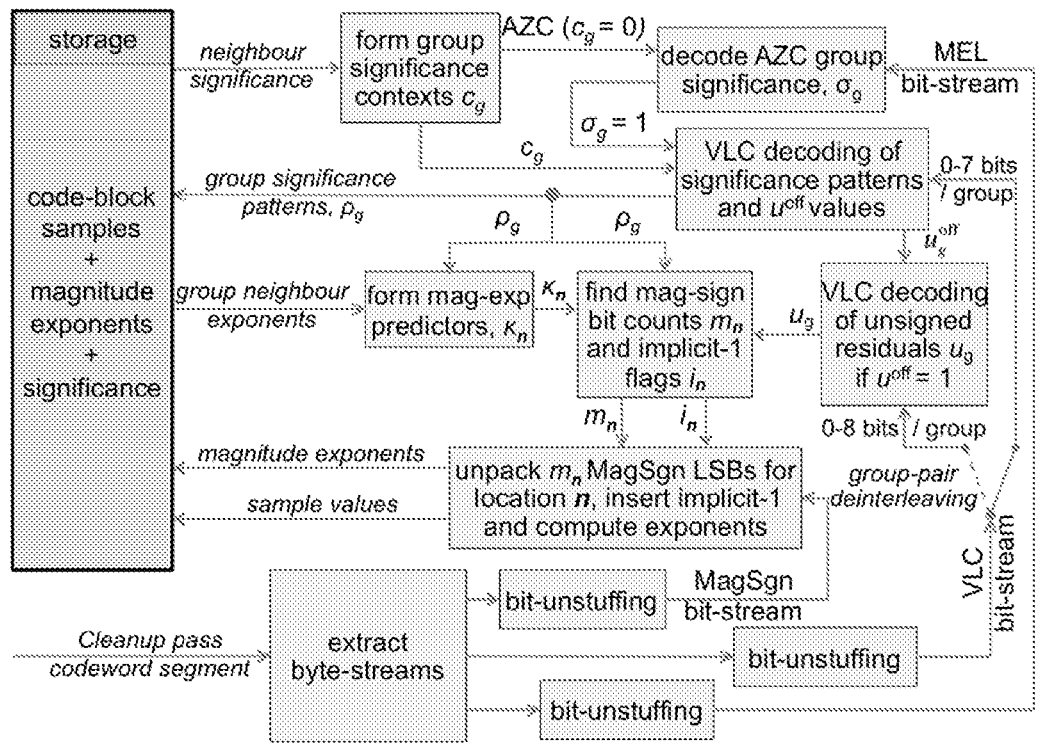
FIG. 3 is a diagram showing an overview of the FAST Cleanup pass decoding process, in accordance with an embodiment.

Most of this description is devoted to describing the FAST block coder's Cleanup pass. FIG. 2 and FIG. 3 provide summary block diagrams for the encoding and decoding processes, respectively.

The storage element in these figures represents a buffer that can store the code-block's samples, as well as some deduced state information. During encoding, the storage element is populated with subband samples, after which the derived quantities (significance flags and magnitude exponents) can be found immediately. During decoding, the storage element is progressively populated with subband samples and the derived quantities (significance flags and magnitude exponents) as the decoding progresses. The storage element need not necessarily accommodate all samples or derived quantities for the entire code-block, but it is easiest to conceptualize things this way.

An important feature of the Cleanup pass is that its codeword segment actually consists of three byte streams that grow in different directions. Three separate bit-streams are subjected to bit-stuffing and packed into the three byte streams in a way that avoids the appearance of false marker codes in the range FF90h to FFFFh. Care is also taken to combine the byte streams into the single Cleanup codeword segment in such a ways that the entire codeword segment is free from false marker codes and does not terminate with an FFh, which are fundamental requirements for all JPEG 2000 codeword segments.

This triple bit-stream arrangement has distinct advantages over a single interleaved bit-stream. In particular, it provides important decoupling between different elements of the encoding and decoding algorithms, allowing these elements to be executed in parallel or in an order that is most beneficial for the implementation platform. In a software environment, registers and vector processing blocks can be optimized much more aggressively than would be possible without the 3 bit-stream organization. In hardware implementations, the 3 bit-stream organization provides better concurrency and allows the actual amount of local storage to be reduced very aggressively, down to as little as 2 or 3 code-block lines. Fundamentally, the optimal ordering for different elements of the algorithm is different for encoding and decoding and different in hardware and software deployments, depending also on vector processing lengths. A tightly interleaved bit-stream cannot accommodate any more than one processing order, while the 3 bit-stream organization provides the flexibility needed to create highly efficient implementations on a wide range of platforms.

The three bit-streams employed within the Cleanup pass are known here as the "MEL bit-stream" (or simply MEL-stream), the "VLC bit-stream" (or simply the VLC-stream) and the "MagSgn bit-stream" (or simply MagSgn-stream).

Detailed Description of the FAST Cleanup Pass Algorithm

Significance, Exponents, Implicit-1 and MagSgn Values

To understand the FAST Cleanup algorithm, we begin by providing definitions for key quantities that are involved. As already mentioned, the Cleanup pass is associated with a particular bit-plane p, wherein the magnitude of sample X[n] is taken to be $$M_p[n] = \left\lfloor \frac{|X[n]|}{2^p \Delta} \right\rfloor$$

and the sample is considered significant if $M_p[n] \neq 0$. The sample's magnitude exponent $E_p[n]$ is defined here as follows:

$$E_p[n] = \min\{E \in \mathbb{N} \mid M_p[n] - \frac{1}{2} < 2^{E_p[n]-1}\}$$

where $\mathbb{N}$ is of natural numbers. Table 1 provides a detailed elaboration of the relationship between sample magnitude $M_p$ and exponent $E_p$. Note that the JPEG 2000 family of standards support subband samples with magnitudes up to (but not including) $2^{37}$, so exponents need never exceed 38.

TABLE 1

Mapping of subband sample magnitudes to magnitude exponents.

| $M_p$ | $E_p$ |
|---|---|
| 0 | 0 |
| 1 | 1 |
| 2 | 2 |
| 3-4 | 3 |
| 5-8 | 4 |
| 9-16 | 5 |
| 17-32 | 6 |
| 33-64 | 7 |
| 65-128 | 8 |
| 129-256 | 9 |
| 257-512 | 10 |
| $2^9 + 1 - 2^{10}$ | 11 |
| $2^{10} + 1 - 2^{11}$ | 12 |
| $2^{11} + 1 - 2^{12}$ | 13 |
| $2^{12} + 1 - 2^{13}$ | 14 |
| $2^{13} + 1 - 2^{14}$ | 15 |
| $2^{14} + 1 - 2^{15}$ | 16 |
| $2^{15} + 1 - 2^{16}$ | 17 |
| $2^{16} + 1 - 2^{17}$ | 18 |
| $2^{17} + 1 - 2^{18}$ | 19 |
| $2^{18} + 1 - 2^{19}$ | 20 |
| $2^{19} + 1 - 2^{20}$ | 21 |
| $2^{20} + 1 - 2^{21}$ | 22 |
| $2^{21} + 1 - 2^{22}$ | 23 |
| $2^{22} + 1 - 2^{23}$ | 24 |
| $2^{23} + 1 - 2^{24}$ | 25 |
| $2^{24} + 1 - 2^{25}$ | 26 |
| $2^{25} + 1 - 2^{26}$ | 27 |
| $2^{26} + 1 - 2^{27}$ | 28 |
| $2^{27} + 1 - 2^{28}$ | 29 |
| $2^{28} + 1 - 2^{29}$ | 30 |
| $2^{29} + 1 - 2^{30}$ | 31 |
| $2^{30} + 1 - 2^{31}$ | 32 |
| $2^{31} + 1 - 2^{32}$ | 33 |
| $2^{32} + 1 - 2^{33}$ | 34 |
| $2^{33} + 1 - 2^{34}$ | 35 |
| $2^{34} + 1 - 2^{35}$ | 36 |
| $2^{35} + 1 - 2^{36}$ | 37 |
| $2^{36} + 1 - 2^{37}$ | 38 |

We observe that a sample is significant if and only if its exponent is non-zero. The FAST Cleanup algorithm explicitly codes significance information, after which it is only necessary to code the sign $\chi[n]$ and the value of $M_p[n]-1$ for each significant sample. This information is combined into a so-called "MagSgn" value $$v_p[n] = \chi[n] + 2(M_p[n]-1) < 2^{E_p[n]}$$

Non-zero exponents are coded via so-called "unsigned residuals" with respect to a set of exponent predictors $\kappa_p[n]$. The nature of this residual coding process is that the coded information may only provide a bound $$U_p[n] \geq E_p[n]$$

on the exponent. The $U_p[n]$ LSB's of $v_p[n]$ certainly provide a complete description of the sign and magnitude for each significant sample. However, in the event that the decoder can know that the bound is tight (i.e., $U_p[n]=E_p[n]$) and $E_p[n]>1$, it is sufficient to emit only the $U_p[n]-1$ LSB's of $v_p[n]$, since the most significant bit amongst the $U_p[n]$ LSB's of $v_p[n]$ is implicitly known to be 1.

To capture this, "implicit-1" condition, we define $$i_p[n] = \begin{cases} 1 & \text{if } U_p[n] > 1 \text{ is known to equal } E_p[n] \\ 0 & \text{otherwise} \end{cases}$$

Then the number of LSB's from $v_p[n]$ that are packed into the MagSgn bit-stream for the significant sample is given by $$m_p[n] = U_p[n] - i_p[n]$$

The sub-sections that follow provide a detailed description of the methods used to code significance information and $U_p[n]$ values and derive the implicit-1 condition $i_p[n]$ for each sample.

As a matter of convenience, we shall usually drop the subscript p (bit-plane index) from the notation developed above, taking it to be implied by the context, while moving the 2D index n that identifies sample locations within the code-block into the subscript position. The notational equivalences are as follows: $M_p[n] \equiv M_n$; $E_p[n] \equiv E_n$; $U_p[n] \equiv U_n$; $\kappa_p[n] \equiv \kappa_n$; $i_p[n] \equiv i_n$; and $v_p[n] \equiv v_n$.

Some features of the coding algorithm that are worth noting up front can now be summarized below. These features may be readily identified within the encoding and decoding block diagrams of FIG. 2 and FIG. 3.

1. Subband samples within a code-block are processed in 2×2 groups g, each of which is assigned a 4-bit significance pattern $\rho_g$ that indicates the significance of each sample in the group.
2. Significance patterns are coded using a combination of two different techniques: an adaptive MELCODE and a set of non-adaptive VLC codes.
3. Exponent bounds $U_n$ are coded via "unsigned prediction residuals" $u_g$ that are common to all samples within a 2×2 group, so that $U_n = f_{pred}(\kappa_n, u_g)$, for all locations n within group g, where $f_{pred}()$ is a fixed function that almost invariably returns $\kappa_n + u_g$.
4. The predictors $\kappa_n$ are derived from magnitude exponents of certain previously coded samples, which themselves depend upon the MagSgn values of earlier samples in the code-block.
5. The significance pattern $\rho_g$ and unsigned prediction residuals $u_g$ for a group are coded jointly, using a VLC coding scheme that involves two sub-codes, one of which (CxtVLC code) is dependent on a neighbourhood significance context $c_g$ and best suited to table-lookup approaches, while the other (U-VLC code) is amenable to direct computation if required.
6. The VLC code bits for pairs of 2×2 groups are interleaved in a manner that facilitates joint encoding or decoding of 8 samples at a time, while allowing 4-sample groups to be encoded or decoded individually if desired.

Bit-Stuffing and Byte-Stream Packing

As mentioned, for compatibility with the JPEG 2000 codestream structure, the FAST block coder's Cleanup pass produces a single codeword segment whose length is communicated for the relevant packet header(s) via the existing methods. In the FAST block coder, however, this codeword segment is divided into three byte-streams, which are derived by bit-stuffing and packing bits from the following three bit-streams:

A. a MagSgn bit-stream, whose packed bytes grow forwards from the start of the codeword segment;
B. a VLC bit-stream, whose packed bytes grow backwards from the end of the codeword segment; and
C. a MEL bit-stream, whose packed bytes grow forwards from the end of the MagSgn byte-stream.

Figure 4:
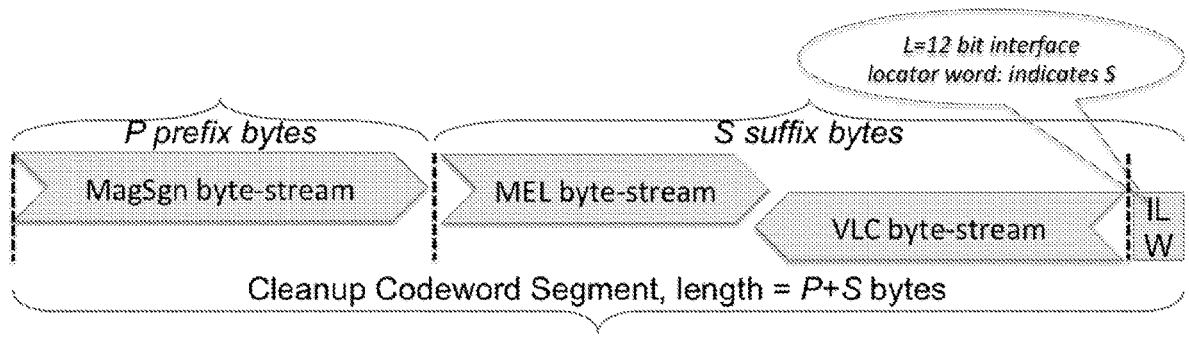
FIG. 4 is a diagram showing a Codeword structure for the FAST Block Coder's Cleanup pass, with three byte-streams, in accordance with an embodiment.

We use the terms bit-stream and byte-stream carefully here. Each bit-stream consists of the string of bits produced by the coding algorithm, whereas the corresponding byte-stream consists of the bytes into which those bits are packed, subject to a bit-stuffing algorithm that serves to avoid the appearance of false marker codes within the final codeword segment. The arrangement of forward and backward growing byte-streams is illustrated in FIG. 4.

Bit-Packing Order and Bit-Stuffing

Bits from the MagSgn bit-stream are packed into bytes of the MagSgn bit-stream in little-endian order, so that the first bit from the MagSgn bit-stream appears in the LSB (bit-0) of the first byte from the MagSgn byte-stream. Once a byte is full, if the value of the byte is FFh, the MSB (bit-7) of the next byte becomes a stuffing bit, with value 0, so that byte has only 7 bits available and cannot exceed 7Fh in value. This means that no pair of consecutive bytes can form a 16-bit big-endian unsigned integer in the range FF80h to FFFFh, and at most one stuffing bit is introduced for every 15 bits that are packed from the MagSgn bit-stream.

Decoders shall extend the MagSgn byte stream with an FFh byte prior to unpacking bits and removing stuffing bits.

Note: Encoders can, and generally should discard any terminal FFh that would otherwise be emitted to the MagSgn byte-stream.

Bits from the MEL bit-stream are packed into bytes of the MEL byte-stream in big-endian order, so that the first bit from the MEL bit-stream is found in the MSB (bit-7) of the first byte from the MEL byte-stream. Once a byte has been filled, if the value of the byte is FFh, the MSB (bit-7) of the next byte becomes a stuffing bit, with value 0, and the next MEL bit is packed into bit-6 of that byte. Again, this means that no pair of consecutive bytes from the MEL byte-stream can form a 16-bit big-endian unsigned integer with value in the range FF80h to FFFFh, and at most one stuffing bit is introduced for every 15 bits that are packed from the MEL bit-stream.

Bits from the VLC bit-stream are packed into bytes of the VLC byte-stream in little-endian order, although the bytes themselves work backwards from the end of the codeword segment. The fact that bytes are emitted and consumed in reverse order, means that a different bit-stuffing procedure is required. Specifically, let $B_{cur}$ denote a current byte to which bits are being packed during encoding or from which they are being unpacked during decoding, and let $B_{prev}$ denote the previous byte emitted during encoding or consumed during decoding. If $B_{prev} > 8Fh$ and the 7 LSBs of $B_{cur}$ are all 1 then the MSB of $B_{cur}$ is a stuffing bit which shall be 0. Noting that $B_{cur}$ actually precedes $B_{prev}$ within the FAST Cleanup codeword segment, this bit-stuffing procedure ensures that no pair of consecutive bytes from the VLC byte-stream can form a 16-bit big-endian unsigned integer with value in the range FF90h to FFFFh, which is the range of marker codes that must not appear within a JPEG 2000 codestream outside of any marker segment.

Communicating the Suffix Length S Via the Interface Locator Word

The length L of the FAST Cleanup pass's codeword segment is always communicated within the associated JPEG 2000 packet header. The part of this codeword segment that contains the MEL byte-stream and VLC byte-stream is identified as the codeword suffix, consisting of S bytes. The value of S is encoded within 12 bits that are set aside as an Interface Locator Word (ILW), since L-S identifies the interface between the forward growing MagSgn and MEL byte-stream portions of the codeword segment.

The 12 ILW bits correspond to the 8 bits of the last byte in the codeword segment, together with the 4 LSBs of the second last byte in the codeword segment, and all FAST Cleanup codeword segments shall have length L and suffix length S no smaller than 2. The ILW bits are considered to lie within the VLC byte-stream itself. Decoders shall read the ILW bits, decode the value of S, and then overwrite the ILW bits with 1's, including the modified last 2 bytes of the codeword segment within the VLC byte-stream from which VLC bits are extracted, but discarding the first 12 such extracted bits. Encoders should pack 12 1's to the VLC byte-stream before packing actual VLC bits; then, after the byte-streams have been combined into a Cleanup codeword segment, the 12 ILW bit positions are certain to hold 1's, which shall be replaced with the encoded suffix length S. These procedures ensure that bit-stuffing and bit-unstuffing procedures associated with the VLC byte-stream operate in a way that has no dependence on the suffix length itself.

Note that the unpacking of actual VLC bits from the VLC byte-stream can commence from bit-4 of the second last byte in the codeword segment, taking the 4 LSB's of that byte ($B_{cur}$) to be 1's and taking $B_{prev}$ to be FFh.

The suffix length S is encoded within the 12 ILW bits as $$S=B_{L-1}+(B_{L-2}\&0Fh)\times 255$$

where $B_{L-1}$ and $B_{L-2}$ are the last and second last bytes in the codeword segment, respectively, and ($B_{L-2}$ & 0Fh) isolates the 4 LSB's of $B_{L-2}$. In this representation, $B_{L-1}$ shall not be equal to FFh.

Variation 1: It can be shown that the suffix length need never violate the bounds S<2048×17/16, so the 4 LSB's of $B_{L-2}$ cannot all be 1. With this in mind, we can improve upon the ILW encoding policy used here for the final standard, in such as way as to both simplify the encoding of S and deterministically avoid the possibility of stuffing bits appearing in the second last byte of the codeword segment (second byte of the VLC byte-stream). To do this, we could pack the 8 MSB's of a 12-bit representation of S into $B_{L-1}$ without modification, packing the 4 LSB's of S into $B_{L-2}$ also without modification. Then $B_{L-1}$ is certain not to exceed 8Fh so that no stuffing bit is required in $B_{L-2}$, and it is safe to replace all 12 ILW bits with 0s during the unpacking of VLC bits from the VLC byte-stream. This is a desirable modification to the original algorithm.

Termination Procedures

The boundary between the forward growing MEL byte-stream and reverse growing VLC byte-stream is not explicitly signaled. Decoders shall consider all S suffix bytes of the FAST cleanup codeword segment to belong both to the MEL byte-stream and to the VLC byte-stream when unpacking bits. This means that some bits from the suffix might be unpacked to both bit-streams.

Note: the replacement of ILW bits, as described above, shall occur before any MEL or VLC bits are unpacked from the codeword suffix.

Encoders are at liberty to adopt termination procedures that result in overlap between the MEL and VLC byte-streams, so long as this results in correct decoding. In practice, it is valuable and relatively simple for encoders to explore overlaps of 1 byte between these streams.

The individual bit-stuffing procedures associated with the three byte-streams do not guarantee the avoidance of false marker codes at the interface between the byte-streams. This must be ensured during encoder termination. A false marker code is a pair of consecutive bytes that form a 16-bit big-endian unsigned integers in the range FF90h to FFFFh. Avoiding false marker codes between the MEL and VLC byte-streams may require an encoder to insert an additional byte (e.g., an 00h byte).

As noted already above, encoders generally should eliminate any terminal FFh byte that would be emitted to the MagSgn byte-stream, since the decoder always synthesizes one trailing FFh. This approach both helps efficiency and avoids any possibility that false marker codes arise at the interface between the prefix and suffix of the FAST Cleanup codeword segment Scanning Order and 2×2 Group Structure Samples from a code-block of height W and width H are organized into 2×2 groups and processed in the line-interleaved identified in FIG. 5. Note that an extra column is effectively inserted to the right of a code-block whose width is odd, and an extra row is inserted to the bottom of a code-block whose height is odd, so as to ensure that all 2×2 groups contribute 4 samples to the scanning pattern. This padding is applied only in the FAST Cleanup coding pass and has no impact on other coding passes. Samples values associated with padded locations are encoded, but shall all be insignificant—i.e., $M_p=0$.

Significance Patterns, Contexts and AZC Groups

Each group g has a binary significance state $\sigma_g$ that is 1 if any sample in the group is significant, else 0. Additionally, group g has a 4-bit significance pattern $\rho_g$, in the range 0 to 15, each bit of which (from LSB to MSB, in scanning order) is 1 if the corresponding sample in the group is significant. Evidently, $\sigma_g=0 \Leftrightarrow \rho_g=0$.

Each group is assigned a coding context $c_g$ that depends only on the significance information associated with previous groups, visited in the scanning order. This allows significance to be decoded ahead of the magnitude and sign information, which improves computational throughput, at least in software implementations of both the encoder and decoder, and also allows SigProp and MagRef coding passes to be encoded and decoded in parallel with the Cleanup pass.

MEL Adaptive Coding of AZC Groups

Groups g for which $c_g=0$ are said to be in the All-Zero-Context (AZC) state. In practice, these are groups whose causal neighbours are all insignificant, which explains the term AZC. Adaptive coding is employed only to code the significance $\sigma_g$ of AZC groups. Specifically, the binary symbols $\sigma_g$ associated with each AZC group in sequence are concatenated to form a variable length binary string $\sigma_{AZC}[i]$, which is coded within the MEL bit-stream. The encoding and decoding of this AZC symbol string need not be synchronized with any other encoding or decoding steps.

The AZC symbol stream $\sigma_{AZC}[i]$ is first converted to a sequence of run lengths $R_{AZC}[j]$, where each run represents the number of 0's that precede the next 1. Since there is at most one AZC symbol for every group of 4 code-block samples, and no code-block may have more than 4096 samples, the maximum run-length that need be coded is 1024, corresponding to an entirely insignificant code-block.

The MEL coding procedure is a variant of the adaptive run-length coding algorithm in the JPEG-LS standard, that is known as the MELCODE. The MELCODE used in the JPEG-LS standard has 32 states, but a different state machine is employed by the FAST block coder, with only 13 state indices k in the range 0 to 12. Each state k is associated with an exponent $E_{MEL}[k]$ and a threshold $T_{MEL}[k]=2^{E_{MEL}[k]}$. Table 2 lists the values of the key quantities.

TABLE 2

MEL coding state machine

| State k | exponent $E_{MEL}$ | threshold $T_{MEL}$ | next state, hit | next state, miss |
| --- | --- | --- | --- | --- |
| 0 | 0 | 1 | 1 | 0 |
| 1 | 0 | 1 | 2 | 0 |
| 2 | 0 | 1 | 3 | 1 |
| 3 | 1 | 2 | 4 | 2 |
| 4 | 1 | 2 | 5 | 3 |
| 5 | 1 | 2 | 6 | 4 |
| 6 | 2 | 4 | 7 | 5 |
| 7 | 2 | 4 | 8 | 6 |
| 8 | 2 | 4 | 9 | 7 |
| 9 | 3 | 8 | 10 | 8 |
| 10 | 3 | 8 | 11 | 9 |
| 11 | 4 | 16 | 12 | 10 |
| 12 | 5 | 32 | 12 | 11 |

The MEL code is a type of adaptive Golomb code for the run lengths $R_{AZC}[j]$, where the threshold $T_{MEL}[k]$ plays the role of the Golomb parameter. Ignoring the adaptation for the moment, the coding procedure can be summarized as:

while R≥T, emit 1 (a "hit") and subtract T from R
emit 0 (a "miss"), followed by the E LSB's of R The optimal Golomb parameter for an exponentially distributed information source is a little over half of its mean value. Thus, a typical run R should be coded by one hit followed by a miss. This implies that the adaptive state machine should experience one hit and one miss for each run, which is achieved by incrementing the state after each hit and decrementing the state after each miss, as shown in Table 2.

The complete MEL coding algorithm is as follows:

Initialize k=0
For each j=0,1,...
   Set R $R_{AZC}[j]$
   While R ≥ $T_{MEL[k]}$
     Emit "1" ("hit")
     Update R ← R − $T_{MEL}[k]$
     Update k ← min{k + 1,12}
   Emit "0" ("miss")
   Emit $E_{MEL}[k]$ LSB's of R
   Update k ← max{k − 1,0}

Note: While the algorithm is expressed in terms of run length coding, it can always be re-cast as an adaptive state machine that operates on individual symbols, just as binary arithmetic coding can be recast as a state machine that operates on runs. As an encoder for individual AZC symbols, the MEL coder here cannot produce more than 6 code bits, but often produces no bits at all. Both the MQ arithmetic coder used by the J2K-1 algorithm and the MEL coding approach here exhibit roughly the same number of state transitions, but the advantage of the MEL coder is that it has a very small state machine. In software, it is advisable to use small lookup tables to drive the encoding and decoding of runs, where in most cases a single lookup suffices to encode or decode a complete run.

The bits emitted by the MEL coder constitute the MEL bit-stream. Where the last AZC symbol in a code-block is 0, the final run is considered to be "open," meaning that the encoded run value may have any value that is at least as large as Mast, being the number of zeros at the tail of the AZC symbol string.

Note: Encoders can take advantage of the flexibility of "open" runs to terminate the MEL byte-stream in such a way as to maximize the opportunity for overlap with the backward-growing VLC byte-stream.

Significance and $u^{off}$ Coding Via CxtVLC Codes

For non-AZC groups, and AZC groups that are significant (i.e., $\sigma_g=1$), the significance pattern $\rho_g$ is coded, along with other information, using variable length codes that operate on individual 2×2 groups. Two types of codes are employed, which are identified here as CxtVLC codes and U-VLC codes. The resulting code-bits are interleaved on a group-pair basis, as explained later, and form the FAST block coder's VLC bit-stream.

This section is concerned only with CxtVLC codes, which are used to jointly represent the significance pattern $\rho_g$ and a binary value $u_g^{off}$, which indicates whether or not an offset needs to be applied to the predictors $\kappa_n$ associated with samples in group g in order to obtain the corresponding exponent bounds $U_n$. The precise meaning of these $u_g^{off}$ values is provided later in this document.

Figure 6:
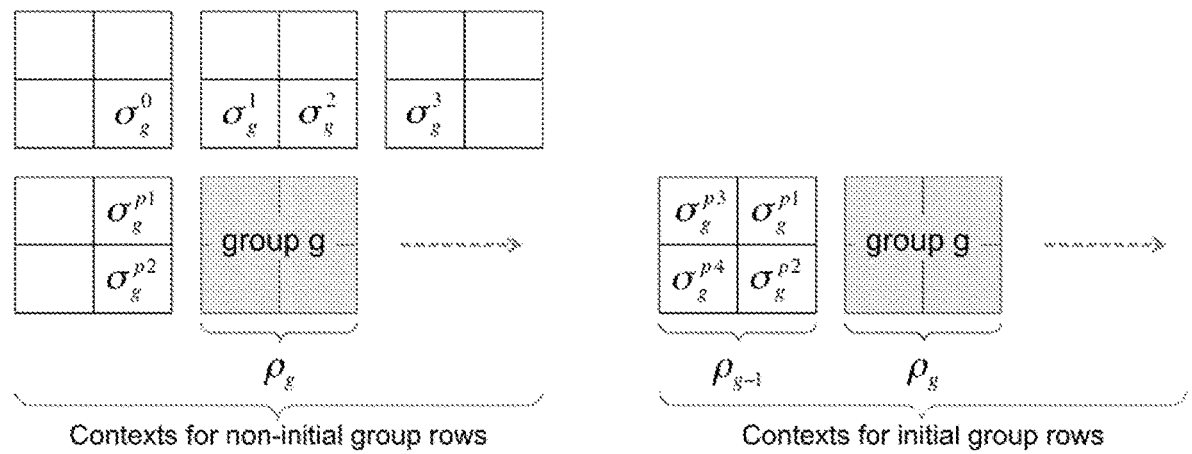
FIG. 6 is a diagram illustrating significance neighborhood information used to form coding contexts for 2×2 groups found in non-initial and initial line-pairs within a code block, respectively, in accordance with an embodiment.

We distinguish between the first line-pair in a code-block (equivalently, the first row of 2×2 groups), for which there is no context information from previous lines, and all non-initial line-pairs. FIG. 6 illustrates the significance information that is used to form context labels for these two cases. The corresponding context labels are computed from this information as follows:

non-initial group rows: $c_g=(\sigma_g^0|\sigma_g^1)+2(\sigma_g^{P0}|\sigma_g^{P1})+4(\sigma_g^2|\sigma_g^3)$ initial group rows: $c_g=\sigma_g^{P1}+2\sigma_g^{P2}+4(\sigma_g^{P3}|\sigma_g^{P4})$ Variation 2: The context labels here take values from 0 to 7, both for initial and non-initial group rows. Since separate CxtVLC code tables are used for each case, it may be preferable to use a smaller set of contexts for the first row of groups, which have less impact on the overall performance of the coder, so as to reduce the footprint of an implementation. In particular, we could use:

initial group rows (alternative): $c_g=(\sigma_g^{P1}|\sigma_g^{P2})+2(\sigma_g^{P3}|\sigma_g^{P4})$ Note: The precise definition of these labels is important only for the correct interpretation of CxtVLC code tables. Permutations of the context labels can equivalently be employed in conjunction with corresponding permutation of the CxtVLC code tables.

CxtVLC Codeword Lengths for Non-Initial Group Rows

For groups found in non-initial group rows (non-initial line-pairs of the code-block), the CxtVLC codewords have lengths of at most 7 bits. There are 8 separate contexts $c_g$, each of which has up to 31 different codewords, corresponding to valid combinations of the 4-bit significance pattern $\rho_g$ and the binary $u_g^{typ}$ value. If an entire group is insignificant, the value of $u_g^{off}$ has no meaning to a decoder, but is taken to be 0 for the purpose of the description here, so the combination $\rho_g=0$, $u_g^{off}=1$ is not valid. The context $c_g=0$ corresponds to an AZC group, whose overall significance is coded within the MEL bit-stream, so that there are only 30 valid codewords, corresponding to non-zero $\rho_g$ patterns with $u_g^{off}$ equal to 0 or 1.

Table 3 provides the codeword lengths for each valid combination of context and codeword. The mapping of codeword lengths to actual codewords is described later in this section.

TABLE 3

CxtVLC coding tables for non-initial group rows.

| $\rho_g$ | $u_g^{off}$ | $c_g = 0$ | $c_g = 1$ | $c_g = 2$ | $c_g = 3$ | $c_g = 4$ | $c_g = 5$ | $c_g = 6$ | $c_g = 7$ |
|---|---|---|---|---|---|---|---|---|---|
| 0 | 0 | — | 1 | 1 | 2 | 1 | 2 | 3 | 4 |
| 1 | 0 | 3 | 4 | 4 | 4 | 5 | 5 | 4 | 6 |
| 1 | 1 | 7 | 7 | 7 | 6 | 7 | 6 | 6 | 7 |
| 2 | 0 | 3 | 4 | 4 | 4 | 5 | 5 | 4 | 6 |
| 2 | 1 | 6 | 7 | 6 | 6 | 7 | 7 | 6 | 7 |
| 3 | 0 | 5 | 5 | 6 | 5 | 7 | 6 | 6 | 6 |
| 3 | 1 | 7 | 6 | 6 | 5 | 7 | 6 | 6 | 6 |
| 4 | 0 | 3 | 5 | 5 | 5 | 4 | 4 | 4 | 6 |
| 4 | 1 | 7 | 7 | 7 | 7 | 6 | 6 | 6 | 7 |
| 5 | 0 | 5 | 6 | 6 | 5 | 6 | 5 | 5 | 5 |
| 5 | 1 | 7 | 7 | 7 | 6 | 7 | 6 | 6 | 6 |
| 6 | 0 | 6 | 7 | 7 | 6 | 6 | 6 | 6 | 6 |
| 6 | 1 | 7 | 7 | 7 | 6 | 7 | 7 | 6 | 7 |
| 7 | 0 | 7 | 7 | 7 | 6 | 7 | 6 | 6 | 5 |
| 7 | 1 | 7 | 7 | 7 | 5 | 7 | 5 | 5 | 4 |
| 8 | 0 | 2 | 4 | 5 | 5 | 4 | 5 | 5 | 6 |
| 8 | 1 | 5 | 7 | 7 | 7 | 7 | 7 | 6 | 7 |
| 9 | 0 | 6 | 6 | 7 | 6 | 7 | 6 | 6 | 6 |
| 9 | 1 | 7 | 7 | 7 | 6 | 7 | 7 | 6 | 7 |
| 10 | 0 | 5 | 6 | 6 | 6 | 6 | 6 | 5 | 6 |
| 10 | 1 | 6 | 7 | 5 | 5 | 7 | 6 | 5 | 6 |
| 11 | 0 | 7 | 7 | 7 | 6 | 7 | 6 | 6 | 5 |
| 11 | 1 | 7 | 6 | 6 | 5 | 7 | 6 | 5 | 5 |
| 12 | 0 | 5 | 6 | 6 | 6 | 5 | 5 | 5 | 6 |
| 12 | 1 | 6 | 7 | 7 | 6 | 5 | 6 | 5 | 6 |
| 13 | 0 | 7 | 7 | 7 | 6 | 7 | 5 | 6 | 5 |
| 13 | 1 | 7 | 7 | 7 | 5 | 7 | 5 | 5 | 5 |
| 14 | 0 | 7 | 7 | 7 | 6 | 7 | 6 | 6 | 5 |
| 14 | 1 | 6 | 7 | 6 | 5 | 6 | 5 | 5 | 5 |
| 15 | 0 | 7 | 7 | 7 | 6 | 7 | 5 | 6 | 3 |
| 15 | 1 | 6 | 6 | 5 | 4 | 5 | 3 | 3 | 2 |

Note:
Implementations may find it useful to populate the coding table with zero-length entries for the invalid combination of $c_g = 0$ with $\rho_g = 0$, so as to avoid conditional branches.

included in the MagSgn bit-stream. The opportunity exists, however, to encode one or more of these bits within an extended CxtVLC code instead. VLC decoding complexity is driven almost entirely by the maximum codeword length, so we only provide msb-pattern information for some codewords—those whose underlying probabilities are large enough to accommodate the extra diversity introduced by msb-pattern coding without requiring codewords longer than 7 bits for the representation to be efficient. Moreover, in general only some of the msb-pattern information is coded within the CxtVLC.

- Variation 3: The CxtVLC codeword tables provided here may be subject to further modification to optimize coding efficiency across a range of imagery types. In particular, it may be desirable to provide distinct codeword tables for different subband orientations.
- Variation m1: An opportunity exists to extend the information that is encoded for $(\rho_g, u_g^{off})$ combinations whose codeword length is less than 7. Let $b_g$ denote the 4-bit word (bit-pattern) that captures the most significant magnitude bit of each sample in group g that, as determined by the corresponding bounds $U_n$. That is, writing $n_j$ for the location of the sample that corresponds to bit-j in the 4-bit pattern words $b_g$ and $\rho_g$, bit-j of $b_g$ is bit $(U_{n_j}-1)$ of $v_{n_j}$ unless bit-j of $\rho_g$ is 0, meaning that $\sigma_{n_j}$ is 0, in which case bit-j of $b_g$ is 0. We identify $b_g$ as the "msb-pattern" for group g. As explained later in this document, whenever $u_g^{off}=1$ and $\rho_g \notin \{0,1,2,4,8\}$, the msb-pattern cannot be inferred by the decoder without explicit communication, so the msb-pattern bit for each significant sample in the group is normally This variation constitutes a variable-to-variable length coding scheme, where both the length of each codeword and the amount of information represented by each codeword are variable. Specifically, in this variation, each codeword in the augmented CxtVLC would identify a $(\rho_g, u_g^{off})$ pair, together with a partial msb-pattern $\bar{b}_g$ and a validity mask $\phi_g$ that indicates which bit positions in $\bar{b}_g$ contain valid msb-pattern information, $\phi_g$ being 0 whenever $u_g^{off}=0$.

The FAST block coding algorithm in this case remains substantially unaltered, except that the MagSgn bit-counts $m_n$ are reduced by 1 for each sample whose $\phi_g$ bit is 1, and the implicit-1 value $i_n$ for each such sample is set to the corresponding bit of $\bar{b}_g$. What this means is that we can gain the (modest$^3$) coding efficiency improvements associated with CxtVLC-based coding of the msb-pattern data, without significantly altering the VLC decoding process or changing the MagSgn packing/unpacking processes. CxtVLC encoding can be expected to become somewhat more complex under this variation, but can be achieved with lookup tables of manageable size, especially noting that CxtVLC lookup latency has almost no impact on encoder throughput (unlike decoder throughput). The main impact on software throughput for this modification is an increase in the complexity of the computation of $m_n$ and $i_n$ values for each sample. We note, however, that this is entirely vectorizable in both the encoder and decoder.

[3] Initial experiments suggest that the typical improvements in coding efficiency resulting from this variation are unlikely to exceed 1.5%.

The augmented CxtVLC described above can be simplified somewhat by replacing the 4-bit validity mask $\phi_g$ with a 2-bit value that indicates the number of final bits of $\overline{b}_g$ that are not valid. Note that there is no need to explicitly communicate the case in which all bits of $\overline{b}_g$ are invalid, since this can easily be identified by otherwise impossible combinations such as $\phi_g=0$ and $\overline{b}_g=0$, which would mean that all msb-pattern bits are equal to 0, which is impossible when $u_g^{off}=1$. An even simpler variation involves reducing the information associated with ($\overline{b}_g$, $\phi_g$) to just a single 2-bit quantity that identifies the number of initial entries of $b_g$ are known to be 0. We note that a decoder can infer an implicit-1 following such 0's wherever the number of zeros is 1 less than the number of significant samples in the group, precisely because $b_g$ cannot be 0 when $u_g^{off}=1$.

CxtVLC Codeword lengths for Initial Group Rows

For the initial row of groups, we do not currently code a $u_g^{off}$ value, since the coding of exponent bounds is also different for these groups. In this case, there are at most 16 valid codewords for each of the 8 context labels, and the codeword lengths are recorded in Table 4.

Variation 4: It may be preferable to increase the similarity between the coding procedure used in initial and non-initial group rows, so we may later adopt a coding table for the initial row of groups that does involve $u_g^{off}$ values. This is discussed further in the notes found in the Section "Coding Techniques Employed within the First Group Row" below.

```
For each w = 0,1, ..., W - 1
    For each i = 0,1, ..., w - 1
        If ($l_w$ < $l_{idx[i]}$) or (($l_w$ = $l_{idx[i]}$) and (i mod 2 ≠ 0))
            Move idx[ ] entries i to w-1 to locations i+1 to w
            Break out of loop without advancing i
    Assign idx[i] = w
```

The condition (1 mod 2≠0) in this sorting procedure is not all that important, but only for consistency with the procedure used to generate the codewords employed during the evaluation of the FAST block coder's coding efficiency.

Once sorting is complete, each codeword is assigned an $l_{max}$-bit unsigned integer $l_w$, where $$l_{max} = \max_w l_w,$$

according to:

$$I_{idx[i]} = \sum_{j=0}^{i-1} 2^{l_{max}-l_{idx[j]}}$$

Finally, VLC actual codeword $c_w$ is formed from the $l_w$ most significant bits of $I_w$ written in big-endian order. That is, the first bit of $c_w$ is the MSB (bit $l_{max}-1$) of $I_w$, while the last bit of codeword $c_w$ is bit $l_{max}-l_w$ of $I_w$. As noted already, this is the well-known MacMillan assignment. The assignment is unique up to a permutation of the codewords which have identical lengths, for which the order is defined by the explicit sorting procedure above.

Predictors, U-Bounds and U-VLC Code to Non-Initial Group Rows

This section is concerned exclusively with the coding of magnitude exponent bounds for non-initial group rows. Samples belonging to the first row of groups within a code-block are treated somewhat differently, as described later.

Figure 7:
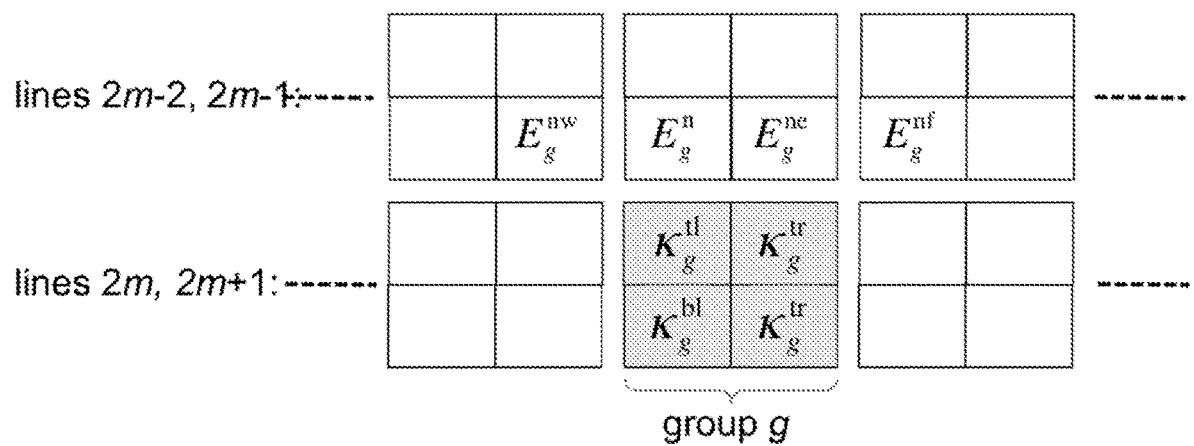
FIG. 7 is a diagram illustrating formation of exponent predictors within non-initial group rows, in accordance with an embodiment.

A predictor $\kappa_n$ is formed for each significant sample, based on magnitude exponents from the preceding group-row. FIG. 7 identifies the four exponents that are used to form predictors for significant samples[4] within a group g,

TABLE 4

CxtVLC coding tables for initial group rows.

| $\rho_g$: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $c_g$ = 0: | — | 3 | 3 | 5 | 3 | 4 | 5 | 6 | 3 | 6 | 4 | 5 | 3 | 5 | 5 | 4 |
| $c_g$ = 1: | 1 | 4 | 5 | 5 | 4 | 4 | 6 | 6 | 5 | 6 | 6 | 6 | 5 | 5 | 6 | 4 |
| $c_g$ = 2: | 1 | 5 | 4 | 5 | 5 | 6 | 6 | 6 | 4 | 6 | 4 | 6 | 5 | 6 | 5 | 4 |
| $c_g$ = 3: | 2 | 5 | 5 | 4 | 5 | 5 | 6 | 4 | 5 | 6 | 5 | 4 | 5 | 5 | 5 | 2 |
| $c_g$ = 4: | 1 | 5 | 5 | 5 | 4 | 5 | 6 | 6 | 4 | 6 | 6 | 5 | 5 | 5 | 5 | 4 |
| $c_g$ = 5: | 3 | 4 | 5 | 5 | 5 | 2 | 5 | 4 | 5 | 5 | 5 | 5 | 4 | 5 | 3 |   |
| $c_g$ = 6: | 3 | 5 | 4 | 5 | 5 | 5 | 5 | 5 | 5 | 5 | 2 | 4 | 5 | 5 | 4 | 3 |
| $c_g$ = 7: | 5 | 6 | 6 | 5 | 6 | 5 | 6 | 4 | 6 | 6 | 5 | 4 | 5 | 4 | 4 | 1 |

Conversion CxtVLC Codeword Lengths to Actual Codewords

The actual VLC codewords $c_w$ associated with the entries in each of Table 3 and Table 4 are obtained via the MacMillan assignment procedure, which yields a prefix code for each context. Write $l_w$ for the length of the codeword with entry w in the above tables, where w=0 is the first valid entry for a context label, and w=W−1 is the last entry, with W the number of valid codewords for that context. The codewords are first sorted from shortest to longest using an index table idx[ ], as follows:

where the location sub-script n is replaced with the more convenient group-relative labels "tl", "bl", "tr" and "br". Decoders generally need to derive these magnitude exponents from fully decoded sample values within the second line of the previous group row.

[4] Predictors for insignificant samples in the group can be formed in the same way, but have no impact on the encoding or decoding process.

A first step in the formation of predictors is to form estimated exponents $P_g^{tl}$, $P_g^{tr}$, $P_g^{bl}$ and $P_g^{br}$ from $E_g^{nw}$, $E_g^{n}$, $E_g^{ne}$ and $E_g^{nf}$. The assignment employed is simply $$P_g^{tl} = P_g^{tr} = P_g^{bl} = P_g^{br} = \gamma_g \cdot \max\{E_g^{nw}, E_g^{n}, E_g^{ne}, E_g^{nf}\},$$

where $\gamma_g$ is equal to 1 if group g has more than one significant sample, and 0 otherwise. The $\gamma_g$ value can be interpreted as a "multiple significance" mask.

The estimated exponents are converted to predictors using $$\kappa_n = \max\{P_n, 1\} - Z_g,$$

where $Z_g$ is a prediction offset for the group g to which location n belongs, which is 1 if all significant samples in the group have estimated exponents of 2 or more, else 0. The offset; effectively allows $u_g$ to represent prediction residuals as small as $-1$; it can be written formally as $$Z_g = \min\left\{1, \min_{n \in \text{group } g}(\max\{P_n, 1\} - \sigma_n)\right\}$$

For each significant group g, a single unsigned residual $u_g \in \{0, 1, \ldots, 36\}$ is coded jointly via CxtVLC and U-VLC codes. Specifically, the CxtVLC code is used to communicate the binary value $$u_g^{\text{off}} = \min\{u_g, 1\} = \begin{cases} 0 & u_g = 0 \\ 1 & u_g > 0 \end{cases}$$

while the U-VLC code represents the actual $u_g$ values when $u_g^{\text{off}}$ is 1.

From $\kappa_n$ and the $u_g$ value for the group that contains location n, decoders derive the exponent bound $U_n$ according to $$U_n = \sigma_n \cdot f_{\text{pred}}(\kappa_n, u_g) = \sigma_n \cdot \begin{cases} \kappa_n + u_g & u_g < 36 \\ 38 & u_g = 36 \end{cases}$$

Here, the binary significance value $\sigma_n$ forces $U_n$ to zero for all insignificant samples.

Note: The special condition $u_g = 36$ is required only because the U-VLC code is not capable of representing $u_g$ values in excess of 36, while $\kappa_n$ may be as small as 1 and the JPEG 2000 family of standards provides for subband samples whose magnitude exponents may be as large as 38. To address this, $u_g = 36$ is treated as an "escape code" which forces significant samples to take the maximum exponent bound of $U_g = 38$.

Encoders are required to ensure that the value of $u_g$ takes the smallest non-negative value that is consistent with the requirement that $U_g \geq E_g$, which can be written as $$u_g = \min\left\{36, \max\left\{0, \max_{n \in \text{group } g} E_n - \kappa_n\right\}\right\}$$

This hard constraint ensures that a decoder implementation that supports only subband samples with limited precision (e.g., up to 32 bits/sample) can avoid the need to test and process the special condition $u_g = 36$ identified above. It also ensures that if group g has only one significant sample, that sample's exponent bound $U_n$ will be equal to $E_n$, whenever $u_g > 0$ and $u_g > 36$. This allows us to assign the implicit-1 bit for a sample at location n that belongs to group g as follows:

$$i_n = \sigma_n \cdot (1 - \gamma_g) \cdot u_g^{\text{off}} \cdot \begin{cases} 1 & u_g < 36 \\ 0 & u_g = 36 \end{cases}$$

That is, the decoder can deduce the presence of an implicit-1 immediately beyond the $m_n$ LSBs of the MagSgn value $v_n$ that are packed into the MagSgn bit-stream, whenever the sample at location n is the only significant sample within its group g (i.e., $\gamma_g = 0$), $u_g^{\text{off}} = 1$ (i.e., $u_g > 0$) and $u_g$ is not equal to the escape value of 36.

Note: In the foregoing description, some quantities take the same value for all samples in the same group, as a result of the estimated exponent assignment that leaves $P_g^{tl} = P_g^{tr} = P_g^{bl} = P_g^{br}$. Each group thus only actually has one exponent predictor $\kappa_g^{tl} = \kappa_g^{tr} = \kappa_g^{bl} = \kappa_g^{br} = \kappa_g$ and so $U_n$ can be written as $\sigma_n U_g$ and $i_n$ can be written as $\sigma_n i_g$, where $$U_g = \begin{cases} \kappa_g + u_g & u_g < 36 \\ 38 & u_g = 36 \end{cases}$$

$$i_g = (1 - \gamma_g) \cdot u_g^{\text{off}} \cdot \begin{cases} 1 & u_g < 36 \\ 0 & u_g = 36 \end{cases}$$

and the encoder is required to select $$u_g = \min\left\{36, \max\left\{0, \left(\max_{n \in \text{group } g} E_n\right) - \kappa_g\right\}\right\}$$

The U-VLC code that is used to represent non-zero values of $u_g$ consists of prefix and suffix components that are designed to be interleaved on a group-pair basis. The prefix uniquely determines the length of the suffix, if any, and is small enough to allow prefixes for a pair of groups to be decoded together using a modest table lookup. Table 5 provides all relevant details of the code.

TABLE 5

U-VLC code used for coding non-zero unsigned residuals $u_g$, within non-initial group rows. Here, and $l_p(u)$ and $l_s(u)$ denote the lengths of the prefix and suffix parts of the codeword for $u_g = u$. Quoted prefix codewords here are read as strings from the left to right, meaning that the first bit emitted to the bit-stream is the one that appears first in the string. The suffix, if any, is a binary unsigned integer whose bits are emitted to the bit-stream in little-endian order - i.e. starting from the LSB.

| u | prefix | Suffix | $l_p(u)$ | $l_s(u)$ | $l_p(u) + l_s(u)$ |
|---|---|---|---|---|---|
| 1 | "1" | — | 1 | 0 | 1 |
| 2 | "01" | — | 2 | 0 | 2 |
| 3 | "001" | (u − 3) | 3 | 1 | 4 |
| 4 | "001" | (u − 3) | 3 | 1 | 4 |
| 5 | "000" | (u − 5) | 3 | 5 | 8 |
| 6 | "000" | (u − 5) | 3 | 5 | 8 |
| ... | ... | ... | ... | ... | ... |
| 36 | "000" | (u − 5) | 3 | 5 | 8 |

Coding Techniques Employed within the First Group Row

For the initial row of groups within a code-block, no magnitude exponents are available from a previous scan-line.

Since this case may be important in low latency applications, where the code-block height is usually small, an alternate mechanism is employed for coding exponent bounds, involving a form of horizontal prediction that can be achieved without introducing additional latency.

The alternate mechanism developed here again involves predictors and unsigned residuals $u_g$, but prediction is formed relative to a base value $B_g$, which is adapted from group to group and can be interpreted as a state variable. A single exponent bound $U_g$ is decoded for each group g, having the value $$U_g = \begin{cases} 0 & \text{if } \rho_g = 0 \\ B_g + u_g - 2 & \text{if } \rho_g \neq 0 \text{ and } (u_g - 2) < 36 \\ 38 & (u_g - 2) = 36 \end{cases}$$

where the base $B_g$ is updated according to $$B_g = \begin{cases} 0 & \text{if } \rho_g = 0, \text{ else} \\ 1 & \text{if } g = 0 \text{ or } \gamma_g = 0, \text{ else} \\ \min\{3, U_{g-1}\} & \text{otherwise} \end{cases}$$

Recall that $\gamma_g$ is equal to 1 if group g has more than one significant sample, else $\gamma_g$ is equal to 0. As for non-initial row groups, this formulation allows $U_g$ to take values as large as 38, by treating the maximum encodable value $(u_g-2)=36$ as a special escape code.

For a consecutive collection of groups with more than one significant sample, it is possible to understand the unsigned residuals $u_g$ as the offset (by 2) difference between consecutive values of $U_g$, since in this case $U_g = U_{g-1} + (u_g - 2)$. For a group with only one significant sample, the relations above force $B_g$ to 1, so that $U_g = u_g - 2$ has no dependence on previous groups. The special value $B_g = 0$ is not strictly important, since it corresponds to an insignificant group, for which no $u_g$ value is coded or used; however, this special value can be used to facilitate efficient implementations that are based on lookup tables.

As in non-initial group rows, encoders are required to choose the smallest value for $u_g$ that is consistent with the above equations while ensuring that $U_g \geq E_n$ for each location n in group g.

Evidently, some values for $u_g$ should not be admissible, and this is reflected in the use of a modified U-VLC code for $u_g$ within the initial group row. The U-VLC code adopted in the initial group row is conditioned on the value of the base variable $B_g$. Moreover, we do not currently code a $u_g^{off}$ value as part of the CxtVLC in the initial group row, so the U-VLC involves a non-empty codeword for every significant group.

The implicit-1 condition for the initial row of groups is as follows:

$$i_n = \sigma_n \cdot (1 - \gamma_g) \cdot \begin{cases} 1 & \text{if } 0 < u_g - 2 < 36 \\ 0 & \text{otherwise} \end{cases}$$

The B-dependent U-VLC (or "BU-VLC") code used in the first row of groups is specified in Table 6. Since the prefix of the codeword never exceeds 4 bits in length, efficient LUT-based decoding strategies can be developed, indexed by the 2-bit $B_{g-1}$ value, together with the 4-bit codeword prefix, which return the prefix length, a suffix length (often zero), the decoded $U_g$ bound and the updated $B_g$ value that will be used to index the BU-VLC table for group g+1, after adjusting for the conditions $\rho_{g+1}=0$ or $M_{g+1}=0$.

TABLE 6

B-dependent U-VLC code used for coding unsigned residuals $u_g$, within the initial row of groups in a code-block. Here, $l_p(u, B)$ and $l_s(u, B)$ denote the prefix and suffix lengths. Quoted prefix codewords here are read as strings from left to right, meaning that the first bit emitted to the bit-stream if the one that appears first in the string. The suffix, if any, is a binary unsigned integer whose bits are emitted to the bit-steam in little-endian order - i.e., starting from the LSB.

| u − 2 | B | prefix | Suffix | $l_p$ (u, B) | $l_s$ (u,B) | $l_p$ (u, B) + $l_s$ (u, B) |
|---|---|---|---|---|---|---|
| — | 0 | — | — | 0 | 0 | 0 |
| −2 | 3 | "0011" | — | 4 | 0 | 4 |
| −1 | 2, 3 | "011" | — | 3 | 0 | 3 |
| 0 | 1, 2, 3 | "1" | — | 1 | 0 | 1 |
| 1 | 2, 3 | "010" | — | 3 | 0 | 3 |
| 1 | 1 | "01" | — | 2 | 0 | 2 |
| 2 | 3 | "0010" | — | 4 | 0 | 4 |
| 2 | 1, 2 | "001" | — | 3 | 0 | 3 |
| 3 | 1, 2, 3 | "0001" | (u − 5) | 4 | 1 | 5 |
| 4 | 1, 2, 3 | "0001" | (u − 5) | 4 | 1 | 5 |
| 5 | 1, 2, 3 | "0000" | (u − 7) | 4 | 5 | 9 |
| ... | ... | ... | ... | ... | ... | ... |
| 36 | 1, 2, 3 | "0000" | (u − 7) | 4 | 5 | 9 |

Variation 5: The different treatment of the initial and non-initial group rows, as described here, imposes a cost on hardware implementations in particular. In most applications, the initial group row contributes relatively little to overall coding efficiency, so it may be preferable to modify the approach to one that is more similar to that used for all non-initial group rows. One approach would be to use exactly the same method as for non-initial group rows, setting all estimated exponents to $P_n=1$, including a binary $u_g^{off}$ variable with the significance pattern that is coded via the CxtVLC code, and adopting the U-VLC code of Table 5.

Variation 6: After the above simplification, a valuable improvement involves using the MEL coding machinery to communicate offsets to certain unsigned prediction residuals $u_g$ in an adaptive way. Specifically, the AZC symbol stream $\sigma_{AZC}[i]$ is augmented by including binary symbols $\kappa_g^{off}$ for non-AZC groups in which $u_g^{off}=1$. The U-VLC code of Table 5 is then used to encode $u_g' = u_g - \kappa_g^{off} \cdot T \geq 1$, where T is a positive integer constant. Encoders choose $\kappa_g^{off}=1$ if and only if this leaves $u_g' \geq 1$. As a result, if $\kappa_g^{off}=0$, the value of $u_g$ necessarily lies in the range 1 to T, which allows the U-VLC code to be truncated. The value T=2 is of particular interest since the truncated U-VLC codes when $\kappa_g^{off}=0$ then reduces to a single binary digit. This modification does not interfere with the valuable property that the MEL-coded symbol stream $s_{MEL}[i]$ holds at most one binary symbol per group, which helps to harmonize the coding methods employed within initial and non-initial group rows. At low bit-rates, or in low activity code-blocks both $\sigma_{AZC}$ and $\kappa_g^{off}$ should exhibit probability distributions skewed heavily towards the outcome 0, which can be efficiently coded using the adaptive MEL coding procedure.

Variation k1: In the interest of simplification and further enhancing throughput, it is valuable to reduce the number of potential non-AZC symbols associated with Variation 6. This variation introduces a single non-AZC MEL coded binary symbol $\kappa_{g_1 g_2}^{off}$ for the group-pair consisting of groups $g_1=2g$ and $g_2=2g+1$, whose CxtVLC and U-VLC bits are interleaved as explained below, whenever $u_{g_1}^{\textit{off}}$ and $u_{g_2}^{\textit{off}}$ are both equal to 1. The symbol $\kappa_{g_1g_2}^{\textit{off}}$ is 1 if both $u_{g_1}^{\textit{off}}$ and $u_{g_2}^{\textit{off}}$ are greater than the constant T, for which the preferred value is again T=2; otherwise, $\kappa_{g_1g_2}^{\textit{off}}=0$. When $\kappa_{g_1g_2}^{\textit{off}}=1$, the U-VLC code is applied to $u_{g_1}'=u_{g_1}-T$ and $u_{g_2}'=u_{g_2}-T$; otherwise, if $u_{g_1}=u_{g_2}=1$ but $\kappa_{g_1g_2}^{\textit{off}}=0$, the U-VLC code is applied to $u_{g_1}$ and then also $u_{g_2}$, unless $u_{g_1}>T$, in which case $u_{g_2}$ uses a truncated U-VLC code. Again, in the case where T=2, the truncated U-VLC code reduces to a single binary digit that encodes the value $u_{g_2}-1$. It turns out that this modification of Variation 6 has on average slightly inferior coding efficiency, but can be implemented with lower complexity and higher throughput than Variation 6. One advantage of this variation over Variation 6 is that there is no need to introduce a dependence on whether or not a group is an AZC group. Instead the presence of the $\kappa_{g_1g_2}^{\textit{off}}$ symbol and its implications for the coding of unsigned residual values for each quad depends only on the $u_{g_1}^{\textit{off}}$ and $u_{g_2}^{\textit{off}}$ values that are already involved in efficient pair-wise U-VLC encoding and decoding implementations.

Variation m2: The same approach described in Variation m1, for incorporating partial msb-pattern into an augmented CxtVLC table whose codeword lengths are not increased as a result, could be employed for the initial row of groups also. In this case, the benefit in coding efficiency can be expected to be larger, since the case $u_g^{\textit{off}}=1$ is more common within the initial group of rows.

Organization of the VLC Bit-Stream

The VLC bit-stream is comprised of bits from the CxtVLC codes and the U-VLC codes, which are interleaved on a group-pair basis. For code-blocks that have an odd number of 2×2 groups per group row, each row of groups is padded with an extra 2×2 group that has no CxtVLC codeword or AZC symbol, and is always insignificant, so that it also has no U-VLC codeword. In this way, each group row is partitioned into a whole number of group pairs, from left to right.

Figure 8:
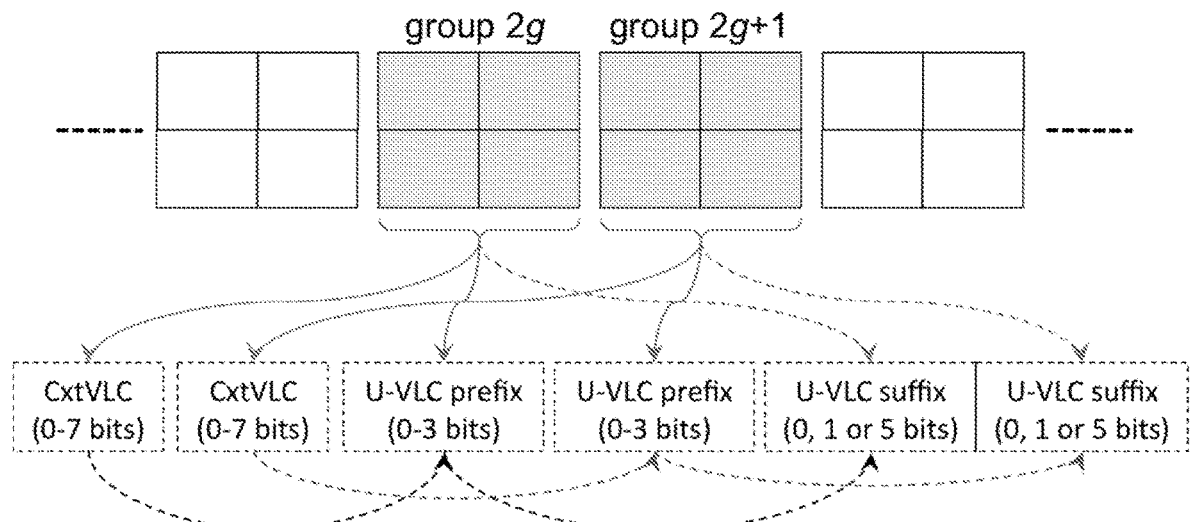
FIG. 8 is a diagram illustrating interleaving of VLC bits from a pair of groups. Bit-count ranges are applicable to non-initial group rows of the code block. Arrows at the bottom of the figure reveal decoding dependencies.

The VLC bit-stream is formed by emitting first the (possibly empty[5]) significance CxtVLC codewords associated with a pair of groups, then any U-VLC code prefix for each group in the pair, and finally any U-VLC code suffix for each group in the pair. All such VLC bits precede those from the next group pair in lexical order. This interleaving strategy is illustrated in FIG. 8, along with the associated decoding dependencies. The interleaving procedure is identical for initial and non-initial group rows within the code-block, although the number of bits associated with each interleaved component may be different in the initial group row.

[5] "Empty" here refers to insignificant AZC groups, for which no CxtVLC codeword exists, as well as groups that are added as padding to ensure that each group row has a whole number of group pairs.

One benefit of interleaving is that a pair of U-VLC prefixes can be decoded together, after which the U-VLC suffix lengths are known and CxtVLC decoding can commence immediately within the next group pair. A second benefit is that encoders can generate both CxtVLC and U-VLC bits using a total of only two table lookups per pair of groups.

Organization of the MagSgn Bit-Stream and Sample Value Decoding

Figure 5:
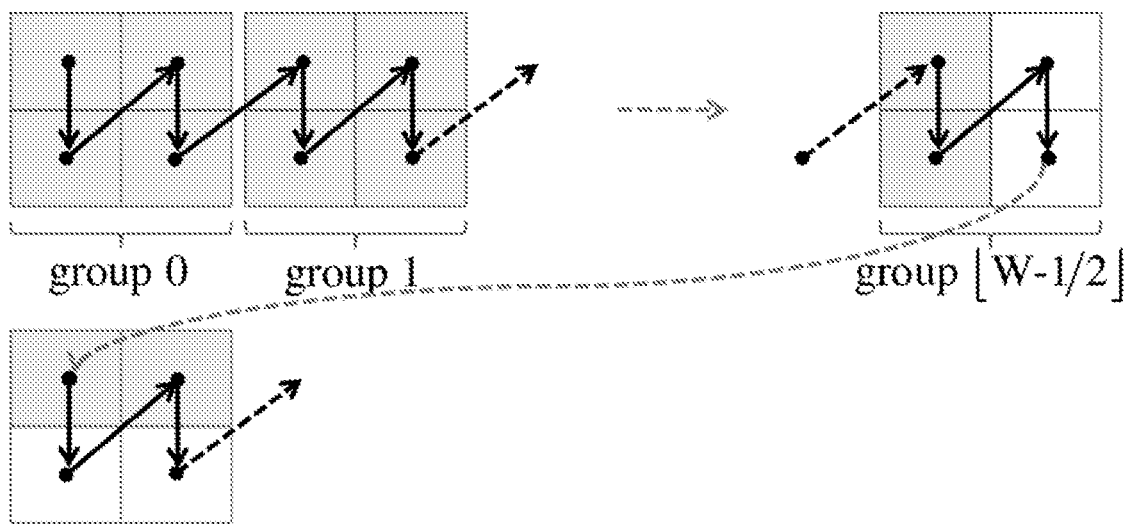
FIG. 5 illustrates a line-interleaved scanning order with square 2×2 groups, showing a code-block with H=3 lines and odd width W.

The MagSgn bit-stream is formed by concatenating the $m_n$ LSBs from each sample's MagSgn value $v_n$, following the scanning order shown in FIG. 5, where $$m_n=U_n-i_n$$

$$v_n=\chi_n+2(M_n-1)$$

and $\chi_n$ is the sample's sign bit, being 1 if the sample is negative and 0 otherwise. Note that $U_n$, $i_n$ and $m_n$ are all zero for samples that are insignificant—i.e., where $\sigma_n=0$, so insignificant samples make no contribution to the MagSgn bit-stream. All significant samples contribute at least 1 bit to the MagSgn bit-stream.

The $m_n$ LSBs of $v_n$ are packed to the MagSgn bit-stream in little-endian order, meaning that the LSB (bit-0) of $v_n$ appears first, finishing with bit-$(m_n-1)$.

Decoders unpack these $m_n$ bits from the MagSgn bit-stream and add in $i_n \cdot 2^{m_n}$ to recover the encoded MagSgn value $v_n$, from which the magnitude $M_n=M_p[n]$ sign $\chi_n=\chi[n]$ are obtained. Decoders generally need to reconstruct at least some of the magnitude exponents $E_n$ from the decoded magnitudes $M_n$, in order to form exponent predictors $\kappa_n$ for samples within the next row of 2×2 groups, so that $m_n$ values can be deduced for those samples.

It is worth noting that these inter-row dependencies do not constrain the order in which significance patterns $\rho_g$ and unsigned residuals $u_g$ are decoded from the VLC bit-stream, so long as sufficient AZC group significance symbols have been decoded from the MEL bit-stream. Moreover, the MEL decoding procedure is entirely independent of both the VLC and MagSgn decoding processes. In summary, VLC decoding depends only on MEL decoding, and MagSgn decoding depends only upon VLC and MEL decoding, while VLC decoding and MagSgn decoding processes each have internal dependencies on the completion of previous VLC and MagSgn decoding steps, respectively.

Detailed Description of the FAST MagRef Coding Pass

The FAST MagRef coding pass is identical to the J2K-1 algorithm's Magnitude Refinement pass when the BYPASS mode is used, except that the raw magnitude refinement bits are packed into bytes in little-endian order, as opposed to big-endian order.

A FAST MagRef pass provides an additional bit of precision to refine the magnitudes of significant samples from the preceding FAST Cleanup pass. Let p denote the bit-plane associated with that Cleanup pass. A MagRef pass may only be present if p>0. The MagRef pass provides the value of $$r_p[n]=(M_{p-1}[n] \bmod 2) \in \{0,1\}$$

for each sample location that is significant with respect to bit-plane p—i.e., each location for which $M_p[n] \neq 0$.

The FAST MagRef pass uses the same 4-line stripe-oriented scanning pattern as the J2K-1 block coder, skipping over insignificant locations and emitting the $r_p[n]$ bits from all other locations to a MagRef bit-stream.

Bits from the MagRef bit-stream are packed into bytes in little-endian order, starting from the LSB of each byte. Once a complete byte is assembled, if the value of that byte is FFh, a stuffing bit (0) is introduced into the MSB (bit-7) of the next byte, which is able to accommodate only 7 bits from the MagRef bit-stream. Decoders extract bits progressively from bytes, starting from the LSB of each byte and working towards the MSB, which is skipped if the previous byte (if any) in the MagRef byte-stream had value FFh.

The last byte in a FAST MagRef byte-stream shall not have the value FFh, meaning that encoders are required to emit the byte that contains any stuffing bit produced via the procedure described above. Unused bits within a final byte of the MagRef byte-stream may take any value so long as this does not leave the last byte equal to FFh.

Detailed Description of the FAST SigProp Coding Pass

The FAST SigProp coding pass is the same as the J2K-1 algorithm's Significance Propagation pass when the BYPASS mode is used, except that significance and sign bits are rearranged and packed into bytes in little-endian order, as opposed to big-endian order.

A FAST SigProp pass provides refined magnitude information for samples that were coded as insignificant within the preceding FAST Cleanup pass, so long as these samples have significant neighbours, based on the information coded previously within either the FAST Cleanup pass or the FAST SigProp pass. Let p denote the bit-plane associated with the preceding Cleanup pass. A SigProp pass may only be present if p>0. The SigProp pass encodes a magnitude bit $$r_p[n]=(M_{p-1}[n] \bmod 2) \in \{0,1\}$$

for each location n such that $m_p^{sp}[n]=1$, where $m_p^{sp}[n]$ is a binary SigProp membership variable, that is computed from $$m_p^{sp}[n] = \begin{cases} 1 & \text{if } (\sigma_p[n] = 1) \text{ and either } (\sigma_p[j] = 1) \\ & \text{for } j \in \mathcal{N}_n, \text{ or } (m_p^{sp}[k]r_p[k] = 1) \text{ for } k \in \overline{\mathcal{N}}_n \\ 0 & \text{otherwise} \end{cases}$$

Here, $\mathcal{N}_n$ is a full neighbourhood that contains all 8 immediate neighbours of location n that lie within the code-block, except where the CAUSAL mode flag is set within the relevant COD/COC marker segment, in which case $\mathcal{N}_n$ omits any neighbours that are found in the next 4-line stripe (i.e., the one that follows the stripe that contains location n). $\overline{\mathcal{N}}_n$ is a neighbourhood similar to $\mathcal{N}_n$, except that it contains only those neighbours that precede location n within the 4-line stripe-oriented scanning pattern.

For full height stripes (i.e., those with 4 actual code-blocks in each stripe column), the $r_p[n]$ bits from all member locations (i.e. locations for which $m_p^{sp}[n]=1$) in a stripe column are emitted to the SigProp bit-stream before emitting the sign bits associated with newly significant members (those for which $r_p[n] \cdot m_p^{sp}[n]=1$). That is, magnitude bits $r_p[n]$ and sign bits are interleaved on a column-by-column basis within each 4-line stripe. By contrast, the J2K-1 Significance Propagation pass interleaves magnitude and sign bits on a sample-by-sample basis.

If the code-block finishes with an incomplete stripe of height 3, magnitude and sign bits are also interleaved on a column-by-column basis within that stripe, but of course there are at most three member locations within each such column.

If the code-block finishes with an incomplete stripe of height 2, magnitude and sign bits are interleaved on a column-pair basis within that stripe, meaning that the magnitude bits from all members within the first pair of stripe columns (4 samples) are emitted to the SigProp bit-stream before the signs of any newly significant members in that pair of stripe columns, and the same is done for each subsequent pair of stripe columns in the code-block. Only those locations that actually lie within the code-block can be members.

If the code-block finishes with an incomplete stripe of height 1, magnitude and sign bits are interleaved on a column-quad basis, meaning that the magnitude bit from all members within a collection of 4 columns (4 samples in this case) are emitted to the SigProp bit-stream before the signs from that collection of columns. Again, only those locations that actually lie within the code-block can be members.

Note: Column and multi-column based interleaving of magnitude and sign bits can have a large beneficial impact on software implementations at least, for both encoding and (especially) decoding. The attention paid here to the special cases of stripes with height 2 and height 1 is important for enabling high throughput in degenerate cases where code-blocks are truncated below their nominal dimensions. This may happen only at the lower boundary of an image or video frame, but it can happen much more frequently if the image is partitioned into tiles, or short and wide precincts dimensions are used to achieve exceptionally low latency or memory utilization. The overall significance of these special cases is very much application dependent and may warrant further consideration.

Variation 7: For hardware implementations in particular, it is preferable to adopt a more unified treatment of stripes with 1, 2, 3 or 4 lines. One good way to achieve this, while preserving high software decoding throughput even with stripes of height 1 and 2, interleave magnitude and sign bits on the basis of column-quads in all stripes, regardless of their height. In this case the magnitude bits from all members within a collection of 4 stripe columns would be emitted to the SigProp bit-stream before the signs from the newly significant samples within that collection of 4 stripe columns. For full height stripes, with 4 lines, this variation would result in the emission of up to 16 magnitude bits to the SigProp pass, followed by up to 16 sign bits corresponding to newly significant samples. For stripes of height 1 there is no difference between this variation of the SigProp pass and the one described above.

Bits from the FAST SigProp bit-stream are packed into bytes in little-endian order and subjected to exactly the same bit-stuffing procedure as the FAST MagRef bit-stream, resulting in a SigProp byte-stream.

Any FAST SigProp byte-stream shall commence from the start of the codeword segment that immediately follows a FAST Cleanup codeword segment. If the TERMINATION mode flag is set in the relevant COD/COC marker segment, the SigProp byte-stream shall occupy its own codeword segment and the last byte in that codeword segment shall not be equal to FFh. In this case, the FAST MagRef byte-stream (if any) shall occupy the following codeword segment and also not terminate with an FFh, as explained previously.

If the TERMINATION mode flag is not set, the SigProp bit-stream and MagRef bit-stream (if any) are concatenated and the resulting bit-stream is packed into a single byte-stream following the little-endian convention, yielding a single codeword segment which again shall not finish with an FFh.

Variation 8: To allow concurrent processing of the SigProp and MagRef coding passes when the TERMINATION flag is not set, a desirable modification to the current approach is to arrange for the MagSgn byte-stream to grow backwards, rather than forwards, so that the start of both the SigProp and MagRef byte-streams can be immediately identified within the single codeword segment that they share.

Codestream Syntax

This section describes a small set of modifications to the codestream syntax described in IS15444-1 that are required to support introduction of the FAST block coder. It is worth highlighting some of the principles behind these changes:

1. It should be possible to use the FAST block coder as a drop-in replacement for the J2K-1 block coder, across the JPEG 2000 family of standards.
2. It should be possible to transcode a J2K-1 based codestream into one that uses the FAST block coder, without losing any information about the quantized images samples—this property is essentially imparted already by the provision of FAST SigProp and MagRef coding passes that encode exactly the same information as their counterparts within the J2K-1 algorithm.
3. It should be possible to transcode a J2K-1 based codestream that has multiple quality layers into one that uses the FAST block coder, while also preserving all information about the layer boundaries associated with each code-block, even if the FAST block coder itself is not highly scalable, so that transcoding back to an original finely embedded representation can be done without any information loss.
4. No change should be made to the JPEG 2000 codestream syntax, or the structure of JPEG 2000 packets, except to the extent that new signaling methods need to be introduced to identify the use of the FAST block coding algorithm.

Carriage of FAST Block Byte-Streams in JPEG 2000 Packets

As described in Annex B of IS15444-1, code-blocks are organized into precincts and each precinct is represented by a sequence of packets, one per quality layer. Each packet has a header, which identifies the contributions made by each code-block of the precinct to that packet, and a body that holds the relevant coded bytes from the precinct's code-blocks. The packet headers identify the number of initial missing most significant magnitude bit-planes for each code-block that makes a contribution, along with the number of coding passes and associated coded length information for each contributing code-block.

Depending on the block coding mode, the coded bytes from each code-block are partitioned into one or more codeword segments. If a code-block contributes coding passes from multiple codeword segments to a packet, the packet header includes sufficient length information to identify the boundaries between codeword segments. In particular, if the TERMINATION mode flag (bit-2 of the code-block style field) is set within the relevant COD/COC marker segment, each coding pass occupies its own codeword segment and so the number of lengths that are communicated by the packet header is identical to the number of included coding passes. If the BYPASS mode flag (bit-0 of the code-block style field) is set, then each bypass Significance Propagation must appear at the start of a codeword segment, and each bypass Magnitude Refinement pass must appear at the end of a codeword segment, which will be the same codeword segment initiated by the preceding Magnitude Refinement pass, unless the TERMINATION mode flag is set.

When the FAST block coding algorithm is used, the FAST Cleanup pass must occupy its own codeword segment the FAST SigProp pass must occupy appear at the start of a codeword segment and each FAST MagRef pass must appear at the end of a codeword segment, regardless of whether the BYPASS mode flag is set or not Note 1: This arrangement of FAST coding passes into codeword segments is consistent with that used by the J2K-1 block coder, when the BYPASS mode flag is set. However, the BYPASS mode flag itself has no meaning to a FAST block decoder.

Note 2: This allows the BYPASS mode flag to be preserved when transcoding from a J2K-1 based codestream to one that uses the FAST block coder, so that the original representation can be restored later through a subsequent transcoding operation.

Figure 9:
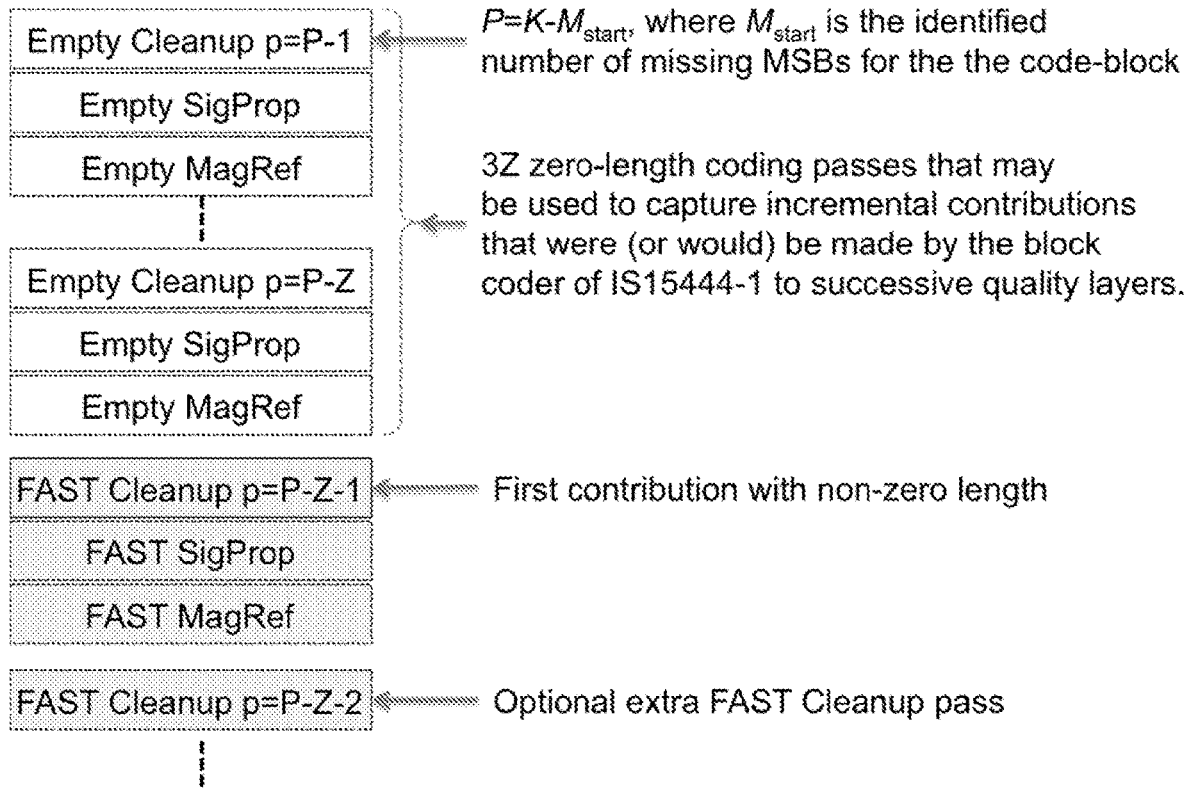
FIG. 9 illustrates possible coding pass contributions recorded in JPEG2000 packet headers, where use of the FAST Block Coding Algorithm is indicated.

If the TERMINATION mode flag is set, then FAST SigProp and MagRef coding passes occupy their own codeword segments.

Where the relevant COD/COC marker segment identifies that the FAST block coder, the coding pass contributions that are recorded in packet headers shall conform to the structure shown in FIG. 9.

In many cases the first coding pass contribution will be a FAST Cleanup pass. However, it is possible that the FAST Cleanup pass is preceded by a set of "empty coding passes", all identified as having zero length. These shall not be interpreted by a decoder as FAST coding passes, since the FAST Cleanup pass must have at least 2 bytes. The number of empty coding passes, if any, shall be 3Z, where Z is a non-negative integer. The bit-plane index p associated with the first FAST Cleanup pass is given by $$p = K - M_{start} - Z - 1$$

where K is the maximum number of magnitude bit-planes associated with the subband, $M_{start}$ is the number of missing MSBs, as signaled in the packet header that identifies the code-block's first contribution, and Z is the number of empty triplets of coding passes that are identified prior to the first contribution with non-zero length.

Note 1: The reason for allowing 3Z empty coding passes to precede the first FAST Cleanup pass is to allow J2K-1 based codestreams to be transcoded to use the FAST block coder, while still preserving all information related to quality layer boundaries from the original codestream. This information may be used to reconstruct the original codestream that was transcoded.

Note 2: The CAP marker segment is used to advise decoders as to whether or not code-blocks might contribute empty coding passes before the first FAST Cleanup pas.

Where Z is non-zero, the codeword segments associated with the 3Z empty coding passes shall be determined based on the mode flags found in the code-block style field of the relevant COD/COC marker segment, as if these coding passes had been encoded using the J2K-1 block coding algorithm. In particular, if the BYPASS mode flag is set, empty SigProp passes in which the arithmetic coder would have been bypassed shall appear at the start of their codeword segment, and empty MagRef passes in which the arithmetic coder would have been bypassed shall appear at the end of their codeword segment, which will be the same codeword segment as the preceding SigProp pass unless the TERMINATION mode flag is set.

It is not required that a code-block contributes any non-empty coding passes, or indeed any coding passes at all, to the codestream. It is possible that more than three FAST coding passes are contributed by a code-block, in which case each successive FAST cleanup pass has bit-plane index p that is one less than the previous one, and hence encodes all information embodied by all previous coding passes.

Note 1: Decoders are recommended to process the last available FAST Cleanup pass for a code-block, along with the FAST SigProp pass (if any) and FAST MagRef pass (if any) which follow.

Note 2: The CAP marker segment is used to advise decoders as to whether or not code-blocks might contribute more than 3 FAST coding passes.

Carriage of Mixed Block Coding Types in JPEG 2000 Packets

Informative: It can be useful to code some code-blocks of a tile-component using the FAST block coding algorithm, while others are coded using the J2K-1 algorithm. The need for this can arise in applications where code-blocks are transcoded on-demand (e.g., when needed to display or communicate a part of the imagery) from one representation to another, so that some code-blocks have been transcoded while others have not.

A mixture of block coding types is permitted only where this is signaled within the relevant COD/COC marker segment as explained below. Moreover, in this case, the CAP marker segment is used to advise decoders that Mixed coding types is a possibility, as explained in Section 0.

When the potential for mixed coding types is indicated in this way, the block coding type that is used for a code-block is identified indirectly through the signaling of length information within packet headers. In all JPEG 2000 codestreams, lengths associated with code-block contributions are signaled using a number of bits that depends on an "Lblock" state variable, that is specific to each code-block, and adjusted progressively during packet header parsing. If the length of the first non-empty contribution to a code-block is signaled using an Lblock value that is larger than it need be, that FAST block coding algorithm has been used, and the structure of all code-block contributions is the one illustrated in FIG. 9. Otherwise, if Lblock is no larger than it need be, then the J2K-1 block coding algorithm has been used, and all included coding passes for the code-block shall be processed in accordance with the J2K-1 algorithm.

Signaling FAST Block Coder Technology Via COD/COC Markers

Codestreams that use the FAST block coder shall contain a CAP marker segment in the main header, which advertises dependence on Part-15 capabilities. If the FAST block coder is used within code-blocks belonging to a given tile-component, then the FAST mode flag (bit-7 of the code-block style field) shall be set (equal to 1) within the relevant COD or COC marker.

Table 7 summarizes the role played by the code-block style field, identifying the impact that the FAST block coding algorithm has on the interpretation of all mode flags.

TABLE 7

Code-block style for the SPcod and SPcoc parameters

Values
(bits)
MSB LSB

00xx xxx0   No selective arithmetic coding bypass
00xx xxx1   Selective arithmetic coding bypass
10xx xxx0   Transcode hint: J2K-1 uses no arithmetic coding bypass
10xx xxx1   Transcode hint: J2K-1 uses selective arithmetic coding bypass
00xx xx0x   No reset of context probabilities on coding pass boundaries
00xx xx1x   Reset context probabilities on coding pass boundaries
10xx xx0x   Transcode hint: J2K-1 does not reset context probabilities
10xx xx1x   Transcode hint: J2K-1 resets context probabilities on coding pass boundaries
x0xx x0xx   No termination on each coding pass
x0xx x1xx   Termination on each coding pass
x0xx 0xxx   No vertically causal context
x0xx 1xxx   Vertically causal context TABLE 7-continued Code-block style for the SPcod and SPcoc parameters Values
(bits)
MSB LSB 00x0 xxxx   No predictable termination
00x1 xxxx   Predictable termination
10x0 xxxx   Transcode hint: J2K-1 does not use predictable termination
10x1 xxxx   Transcode hint: J2K-1 uses predictable termination
000x xxxx   No segmentation symbols are used
001x xxxx   Segmentation symbols are used
100x xxxx   Transcode hint: J2K-1 does not use segmentation symbols
101x xxxx   Transcode hint: J2K-1 uses segmentation symbols
00xx xxxx   J2K-1 block coding algorithm is used
10xx xxxx   FAST block coding algorithm is used
x1xx xxxx   Reserved If bit-5 of the Scod or Scoc field (as appropriate) of that COD/COC marker segment is set, then the COD/COC marker segment also contains a 16-bit SXcod field whose MSB (bit-15) indicates whether or not code-blocks might be coded using the 2K-1 block coding algorithm. This is the "Mixed Coding" mode flag. If the Mixed Coding flag is set, the decoder shall check whether the "Lblock" packet parsing state variable, used to encode the length of the first contribution with non-zero length for a code-block, is larger than it need be to encode that length. As explained above, if Lblock is larger than it need be, the FAST block decoder shall be employed to process that code-block; otherwise, the J2K-1 block decoder shall be used.

Note: The SXcod field is also used in IS15444-2/AMD4, where bit-5 of the SXcod field is also used to signal its presence. In IS15444-2/AMD4, the 2 LSBs of the SXcod field encode a value BB that identifies the number of additional bypassed bit-planes to be used, whenever the BYPASS mode flag (bit-0) of the code-block style field is set. When BYPASS=1 and BB=01, arithmetic coding is bypassed in all bit-planes, for both the SigProp and MagRef coding passes. If the FAST block coder is used, these 2 LSBs of the SXcod field have no meaning for a decoder, but may be used to preserve the block coder modes that were used within an original J2K-1 based JPEG 2000 codestream that has been transcoded to use the FAST block coder.

If bit-7 of the code-block style field is set, but bit-5 of the Scod or Scoc field is not set, the 16-bit SXcod field shall not be present within the COD/COC marker segment, and the code-blocks of all affected tile-components are coded using only the FAST block coding algorithm.

Part-15 Capabilities Flags

We propose to define three bit flags for the Part-15 capabilities word in the CAP marker segment, as follows:

An "Empty Passes" flag indicates that the codestream may contain Z>0 empty coding passes before a FAST Cleanup pass. If this flag is not set (i.e., 0), the first packet contribution from any code-block that uses the FAST block coding algorithm shall be a FAST Cleanup pass.

A "Multiple FAST Cleanup" flag indicates that the codestream may contain more than one FAST Cleanup pass for a code-block. If this flag is not set (i.e., 0), at most one FAST Cleanup pass shall be contributed by any code-block to its precinct's packets.

A "Mixed Coding" flag indicates that more than one type of coding technology may be possible for a code-block, being indicated in the manner described above. If this flag is not set (i.e., 0), all code-blocks whose COD/

COC marker segment has the FAST mode flag (bit-7 of the code-block style field) set shall be decoded using the FAST block coding algorithm, and the SXcod field shall either not be present, or its "Mixed Coding" mode flag shall be 0.

If the "Mixed Coding" flag is set, bit-5 may be set within the codestream's COD and/or COC marker segments, identifying the inclusion of the 16-bit SXcod field, as explained above.

Methods for encoding and decoding using the above embodiments are implemented by processing apparatus which may be configured by software, a mixture of software and hardware, programmed gate array (PGAs) or FPGAs, or any other architecture. The software may be provided in the form of modules. Routines and sub routines, or any software architecture, where software is used to implement embodiments of the invention. Where software is used to implement the invention, the software can be provided on computer readable media, such as discs or as data signals on a network, such as the internet, or any other way.

The above embodiments relate to use within JPEG2000 format Embodiments of the invention are not limited to this. Some embodiments maybe used in other image processing formats. Embodiments may find application in other image processing contexts.

The use of embodiments of the invention are not limited to images or video frames but may be used in any other type of media. For example, embodiments may be utilised with depth coding for multi view imaging and video, or any other visual media.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method for coding blocks of subband sample values, derived from still images, video frames or related media, involving three bit-streams and the partitioning of samples from the block into defined groups, wherein:
   a. a first bit-stream, referred to as MEL bit-stream, encodes the significance of whole groups whose causal neighbours are all insignificant, where samples with non-zero magnitude are identified as significant, and those with zero magnitude as insignificant, these groups being referred to as all-zero-context (AZC) groups;
   b. a second bit-stream, referred to as VLC bit-stream, encodes the significance of individual samples within each group that is either a significant AZC group or not an AZC group;
   c. said second bit-stream also encodes an unsigned residual value for each significant group, that when added to a set of exponent predictors, provides an upper bound on the magnitude exponent of each significant sample in the group;
   d. a third bit-stream, referred to as MagSgn bit-stream, provides a sign bit and any additional magnitude bits required to represent the significant sample values, given the corresponding exponent bounds;
   e. said exponent predictors are computed using both exponent bounds and the additional magnitude bits associated with previous samples in the block, except where such previous samples would lie outside the boundaries of the block.

2. The method of claim 1, wherein the MEL bit-stream is formed by an adaptive run-length coding process that is applied to the string of group significance symbols associated with AZC groups.

3. The method of claim 1, where the causal neighbours for a group correspond to sample locations that are adjacent to the group, being found either to the left of the group and within the same row of groups, or within the previous row of groups, except on the first row of groups, where the causal neighbours for a group correspond to sample locations that are found within the group immediately to the left, where neighbours that are not contained within the block are taken to be insignificant, wherein the significance of all samples in a group is coded jointly, based on a context label that is formed from the significance of the group's causal neighbours.

4. The method of claim 1, wherein the coding of significance patterns involves the use of variable length codes that depend on the context label, referred to as CxtVLC codes.

5. The method of claim 1, wherein the coding of unsigned residuals involves variable length codes, referred to as U-VLC.

6. The method of claim 4, wherein the coding of unsigned residuals involves variable length codes, referred to as U-VL codes, whose codewords consist of prefix and suffix components, the length of the suffix being determined entirely by the value of the suffix, and wherein an unsigned residual offset value is coded together with the significance pattern for a group using CxtVLC codes, said unsigned residual offset indicating whether or not the unsigned residual is non-zero, and the U-VLC code is used only to code unsigned residuals that are non-zero.

7. The method of claim 6, where the CxtVLC codes are augmented to identify a magnitude bit for some significant samples where the unsigned residual offset value associated with a codeword is non-zero, said magnitude bits then not being included within the MagSgn bit-stream.

8. The method of claim 1, wherein said exponent predictors are formed using the values of samples from a previous row of groups, except in the first row of groups for the block, where in the first row of groups, the MEL bit stream is augmented with one additional unsigned residual offset symbol for a collection of groups, the preferable size of a collection being two consecutive groups, and then only when the unsigned residual offset values that are coded jointly with these groups' significance patterns are all non-zero, the unsigned residuals for all groups in the collection being adjusted based on the common additional unsigned residual offset value, prior to application of U-VLC codes to the adjusted unsigned residuals of said groups.

9. The method of claim 1, wherein groups have size 2×2, comprising the samples from a pair of consecutive columns within a pair of consecutive rows in the block.

10. The method of claim 9, where the exponent predictors for samples within a group that is in a non-initial row of groups for the block are formed from the maximum of the magnitude exponents of the 4 samples that are adjacent to said group, being found on the row of samples that lies immediately above said group.

11. The method of claim 1, where the exponent predictor for a significant sample in a group is forced to 1 if it is the only significant sample in said group.

12. The method of claim 1, where the MEL bit-stream, the VLC bit-stream and the MagSgn bit-stream are each subjected to bit-stuffing procedures and packed into bytes to form a MEL byte-stream, a VLC byte-stream and a MagSgn byte-stream, where the VLC byte-stream grows backwards from the end of a single string of bytes that represents a block, while the MagSgn byte-stream grows forwards from the start of said string of bytes, and the MEL byte-stream grows forwards from the end of the MagSgn byte-stream, so that only the boundary between the MagSgn and MEL byte-streams need be explicitly provided along with the string of bytes.

13. The method of claim 1, wherein an additional coding pass, referred to as a SigProp pass is used to code the magnitude, with respect to the next finer magnitude bit-plane, of certain samples that are insignificant at the precision associated with the first magnitude bit-plane, and also to code the sign bit for all such samples that are significant with respect to the finer magnitude bit-plane, following a stripe-oriented scan through the block samples, emitting all relevant magnitude bits from a defined collection of stripe columns to a SigProp bit-stream before emitting sign bits for those samples in the collection of stripe columns that are identified as significant based on the emitted magnitude bits.

14. The method of claim 1, wherein an additional coding pass, referred to as a MagRef pass, is used to code the least significant magnitude bit, with respect to the next finer magnitude bit-plane, of samples that are coded as significant at the precision associated with the first magnitude bit-plane, following a stripe-oriented scan through the block samples, emitting all relevant magnitude bits to a MagRef bit-stream.

15. A method for decoding blocks of subband samples, producing still image, video frames or related media, such samples being arranged into defined groups and represented using three bit-streams, wherein:
   a. a first bit-stream, referred to as MEL bit-stream, is decoded to discover the significance of whole groups whose causal neighbours are all insignificant, where samples with non-zero magnitude are identified as significant, and those with zero magnitude as insignificant, these groups being referred to as all-zero-context (AZC) groups;
   b. a second bit-stream, referred to as VLC bit-stream, is decoded to discover the significance of individual samples within each group that is either a significant AZC group or not an AZC group;
   c. decoding of said second (VLC) bit-stream is also used to discover an unsigned residual value for each significant group, that when added to a set of exponent predictors, provides an upper bound on the magnitude exponent of each significant sample in the group;
   d. a third bit-stream, referred to as MagSgn bit-stream, is unpacked to discover a sign bit and any additional magnitude bits that are used to deduce the value of each significant sample, given the corresponding exponent bounds; and
   e. said exponent predictors are computed using both exponent bounds and the additional magnitude bits associated with previously decoded samples in the block, except where such previous samples would lie outside the boundaries of the block.

16. The method of claim 15, wherein the significance of all samples in a group (the group's significance pattern) are decoded together, using a context label that is formed from the significance of the group's causal neighbours, wherein the decoding of unsigned residuals involves the decoding of variable length codes, referred to as U-VLC codes, the decoding of significance patterns involves the decoding of variable length codes that depend on the context label, referred to as CxtVLC codes, where an unsigned residual offset value is decoded together with the significance pattern for a group, in the process of decoding the CxtVLC codes, said unsigned residual offset indicating whether or not the unsigned residual is non-zero, and the decoding of a U-VLC codeword for the group is performed only if said unsigned residual offset value is non-zero, whereupon the U-VLC decoded result is added to the unsigned residual offset value.

17. The method of claim 16, where an additional magnitude bit is decoded for some significant coefficients together with the significance pattern and unsigned residual offset value, in the process of decoding some CxtVLC codes for which the decoded unsigned residual offset value is non-zero, said additional magnitude bit being combined with bits from the MagSgn bit-stream to reconstruct the associated sample value.

18. The method of claim 15, wherein:
   a. an adaptive run-length decoding process is used to decode the MEL bit-stream, producing a string of group significance symbols that identify the significance of each AZC group;
   b. the causal neighbours for a group correspond to sample locations that are adjacent to the group, being found either to the left of the group and within the same row of groups, or within the previous row of groups, the significance for these samples having already been decoded, except on the first row of groups, where the causal neighbours for a group correspond to sample locations that are found within the group immediately to the left, the significance of these samples having already been decoded, where neighbours that are not contained within the block are taken to be insignificant;
   c. wherein the significance of all samples in a group, known here as the group's significance pattern, are decoded together, using a context label that is formed from the significance of the group's causal neighbours;
   d. the decoding of significance patterns involves the decoding of variable length codes that depend on the context label, known here as CxtVLC codes;
   e. the decoding of unsigned residuals involves the decoding of variable length codes known here as U-VLC codes;
   f an unsigned residual offset value is decoded together with the significance pattern for a group, in the process of decoding the context-dependent variable length codes (CxtVLC codes), said unsigned residual offset indicating whether or not the unsigned residual is non-zero, and the decoding of a U-VLC codeword for the group is performed only if said unsigned residual offset value is non-zero, whereupon the U-VLC decoded result is added to the unsigned residual offset value;
   g. an additional magnitude bit is decoded for some significant coefficients together with the significance pattern and unsigned residual offset value, in the process of decoding some CxtVLC codewords for which the decoded unsigned residual offset value is non-zero, said additional magnitude bit being combined with bits from the MagSgn bit-stream to reconstruct the associated sample value;
   h. said exponent predictors are formed using the values of samples from a previous row of groups, such sample values having been previously decoded, except in the first row of groups for the block, where for the first row of groups, the augmented MEL symbol stream provides a common additional unsigned residual offset value for a collection of groups, the preferable size of a collection being two consecutive groups, and then only when the unsigned residual offset values that are decoded together with these groups' significance patterns are all non-zero, the unsigned residuals for all groups in the collection being adjusted based on the common additional unsigned residual offset value, after decoding of the U-VLC codes for said groups; and i. the exponent predictor for a significant sample in a group is forced to 1 if it is the only significant sample in said group.

19. The method of claim 18, wherein groups have size 2×2, consisting of the samples from a pair of consecutive columns within a pair of consecutive rows in the block, and where the exponent predictors for samples within a group that is in a non-initial row of groups for the block are formed from the maximum of the magnitude exponents at the 4 locations that are adjacent to said group, being found on the row of samples that lies immediately above said group, said magnitude exponents being computed from the previously decoded sample values at these 4 locations.

20. A non-transitory computer readable medium having stored thereon software instructions that, when executed by one or more processors, cause the one or more processors to perform operations for coding blocks of subband sample values, derived from still images, video frames or related media, involving three bit-streams and the partitioning of samples from the block into defined groups, the operations including:

a. a first bit-stream encoding the significance of whole groups, referred to as AZC groups, whose causal neighbours are all insignificant, where samples with non-zero magnitude are identified as significant, and those with zero magnitude as insignificant;

b. a second bit-stream encoding the significance of individual samples within each group that is either a significant AZC group or not an AZC group;

c. said second bit-stream also encoding an unsigned residual value for each significant group, that when added to a set of exponent predictors, provides an upper bound on the magnitude exponent of each significant sample in the group;

wherein a third bit-stream provides a sign bit and any additional magnitude bits required to represent the significant sample values, given the corresponding exponent bounds; and wherein said exponent predictors are computed using both exponent bounds and the additional magnitude bits associated with previous samples in the block, except where such previous samples would lie outside the boundaries of the block.

* * * * *